US012210888B2

(12) United States Patent
Bosnjakovic et al.

(10) Patent No.: US 12,210,888 B2
(45) Date of Patent: Jan. 28, 2025

(54) INDIVIDUAL APPLICATION WINDOW STREAMING SUITABLE FOR REMOTE DESKTOP APPLICATIONS

(71) Applicant: NVIDIA Corporation, San Jose, CA (US)

(72) Inventors: Andrija Bosnjakovic, Redmond, WA (US); Johannes Zimmermann, Berlin (DE); Ashley Reid, Berlin (DE)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 17/676,540

(22) Filed: Feb. 21, 2022

(65) Prior Publication Data

US 2022/0171639 A1 Jun. 2, 2022

Related U.S. Application Data

(63) Continuation of application No. 16/441,578, filed on Jun. 14, 2019, now Pat. No. 11,256,528.

(Continued)

(51) Int. Cl.
*G06F 3/048* (2013.01)
*G06F 3/0482* (2013.01)
(Continued)

(52) U.S. Cl.
CPC ............ *G06F 9/452* (2018.02); *G06F 3/0482* (2013.01); *G06F 3/0484* (2013.01);
(Continued)

(58) Field of Classification Search
CPC ...... G06F 9/452; G06F 3/0482; G06F 3/0484; G06F 2203/04804; H04L 65/70; H04L 65/612

See application file for complete search history.

(56) References Cited

U.S. PATENT DOCUMENTS 4,763,283 A 8/1988 Coutrot
5,949,428 A 9/1999 Toelle et al.
(Continued)

FOREIGN PATENT DOCUMENTS

CN 101652742 A 2/2010
CN 102523443 A 6/2012
CN 102932324 A 2/2013

OTHER PUBLICATIONS

Baratto R.A., et al., "A virtual display architecture for thin-client computing", Department of Computer Science, Columbia University, New York, pp. 1-4, (Oct. 26, 2005).

(Continued)

*Primary Examiner* — Mahelet Shiberou
(74) *Attorney, Agent, or Firm* — Taylor English Duma L.L.P.

(57) ABSTRACT

The present disclosure relates to streaming individual application windows and/or other desktop elements of a remote desktop. Data used to represent irrelevant desktop areas may be replaced with lower entropy data that may be highly compressed in a video stream and/or with data representative of other visual content. The video stream may also include desktop metadata (e.g., locations for desktop visuals, etc.) used to render the desktop elements on the local desktop. The desktop visuals of an application window may be rendered in a proxy window on the local desktop.

20 Claims, 14 Drawing Sheets

Related U.S. Application Data

(60) Provisional application No. 62/751,366, filed on Oct. 26, 2018.

(51) Int. Cl.
  *G06F 3/0484* (2022.01)
  *G06F 9/451* (2018.01)
  *H04L 65/612* (2022.01)
  *H04L 65/70* (2022.01)

(52) U.S. Cl.
  CPC .......... *H04L 65/612* (2022.05); *H04L 65/70* (2022.05); *G06F 2203/04804* (2013.01)

(56) References Cited

U.S. PATENT DOCUMENTS

| | | |
|---|---|---|
| 6,404,814 B1 | 6/2002 | Apostolopoulos et al. |
| 6,369,830 B1 | 8/2002 | Brunner et al. |
| 6,542,165 B1 | 4/2003 | Ohkado |
| 6,577,679 B1 | 6/2003 | Apostolopoulos |
| 6,753,874 B1 | 6/2004 | Ford et al. |
| 6,900,847 B1 | 5/2005 | Agneta et al. |
| 7,034,828 B1 | 4/2006 | Drebin et al. |
| 7,081,904 B2 | 7/2006 | Zoller et al. |
| 7,483,042 B1 | 1/2009 | Glen |
| 7,728,851 B2 | 6/2010 | Kuno |
| 7,757,001 B2 * | 7/2010 | van Ieperen .......... G06F 9/452 709/227 |
| 7,973,806 B2 | 7/2011 | Kuno |
| 8,385,726 B2 | 2/2013 | Kuno |
| 8,509,315 B1 | 8/2013 | Petranovich |
| 8,571,311 B2 | 10/2013 | Yao et al. |
| 8,633,940 B2 | 1/2014 | Pothana |
| 8,640,097 B2 | 1/2014 | Khouzam et al. |
| 8,774,264 B2 | 7/2014 | Nakajima |
| 8,774,536 B1 | 7/2014 | Jia et al. |
| 9,244,912 B1 | 1/2016 | Kominac et al. |
| 9,247,029 B1 | 1/2016 | Jia et al. |
| 9,380,351 B2 * | 6/2016 | Zhao .......... H04N 21/8456 |
| 9,510,048 B2 | 11/2016 | Kamay |
| 9,529,427 B2 | 12/2016 | Raghoebardayal et al. |
| 9,819,937 B1 * | 11/2017 | Helter .......... H04N 19/428 |
| 10,360,729 B2 | 7/2019 | Montgomerie et al. |
| 10,404,769 B2 | 9/2019 | Kacmarcik et al. |
| 10,547,895 B1 | 1/2020 | Morris |
| 10,630,992 B2 | 4/2020 | Seo |
| 11,243,786 B2 | 2/2022 | Zimmermann et al. |
| 11,256,528 B2 | 2/2022 | Bosnjakovic et al. |
| 11,403,121 B2 | 8/2022 | Zimmermann et al. |
| 12,039,350 B2 | 7/2024 | Zimmermann et al. |
| 12,067,409 B2 | 8/2024 | Bosnjakovic et al. |
| 2002/0015064 A1 | 2/2002 | Robotham et al. |
| 2003/0041110 A1 | 2/2003 | Wenocur et al. |
| 2006/0176312 A1 | 8/2006 | Kuno |
| 2007/0019869 A1 | 1/2007 | Ström |
| 2009/0096810 A1 * | 4/2009 | Green .......... G06F 3/1454 345/620 |
| 2009/0210817 A1 | 8/2009 | Schmieder et al. |
| 2009/0284442 A1 | 11/2009 | Pagan |
| 2010/0111410 A1 | 5/2010 | Lu et al. |
| 2010/0290667 A1 * | 11/2010 | Lienhart .......... G06Q 30/0241 382/100 |
| 2012/0075440 A1 | 3/2012 | Ahuja et al. |
| 2012/0082395 A1 | 4/2012 | Abdo |
| 2012/0169923 A1 | 7/2012 | Millar et al. |
| 2012/0226742 A1 | 9/2012 | Momchilov et al. |
| 2012/0284632 A1 | 11/2012 | Baird |
| 2012/0304168 A1 * | 11/2012 | Raj Seeniraj .......... G06F 8/38 718/1 |
| 2012/0317295 A1 | 12/2012 | Baird et al. |
| 2013/0156309 A1 | 6/2013 | Yao et al. |
| 2013/0156310 A1 | 6/2013 | Yao et al. |
| 2014/0122566 A1 * | 5/2014 | Spracklen .......... H04N 19/895 709/203 |
| 2014/0376611 A1 | 12/2014 | Kim et al. |
| 2015/0121243 A1 | 4/2015 | Schmieder et al. |
| 2015/0163281 A1 | 6/2015 | Liu et al. |
| 2015/0188990 A1 | 7/2015 | Kacmarcik et al. |
| 2015/0281698 A1 | 10/2015 | Zhao et al. |
| 2015/0379676 A1 | 12/2015 | Girado et al. |
| 2016/0269708 A1 | 9/2016 | Shen et al. |
| 2017/0091896 A1 | 3/2017 | Lu et al. |
| 2018/0308450 A1 | 10/2018 | Appu et al. |
| 2019/0141366 A1 | 5/2019 | Chen et al. |
| 2022/0365796 A1 | 11/2022 | Bosnjakovic et al. |

OTHER PUBLICATIONS

Google Search, pp. 1-2 (Accessed on Oct. 15, 2020).
Huang, Y., "A workload prediction model for decoding MPEG video Video and its Application to Workload-scalable Transcoding", School of Computing, National University of Singapore, pp. 952-961, (Sep. 28, 2007).
Layek, M.A., et al., "Efficient Screen Splitting Methods—A Case Study in Block-Wise Motion Detection", KSII Transactions on Internet and Information Systems, vol. 10, No. 10, pp. 5074-5094 (Oct. 31, 2016).
Ma, Z., et al., "Advanced Screen Content Coding Using Color Table and Index Map", IEEE Transactions on Image Processing, vol. 23, Issue 10, pp. 4399-4412, (Oct. 2014).
Pereberin, A.V., "Hierarchical Approach for Texture Compression", International Conference Graphicon, pp. 1-5, (1999).
Periasamy, P.S., et al. "A Common Palette Creation Algorithm for Multiple Images with Transparency Information", International Conference on Advances in Computing, Control, and Telecommunication Technologies, IEEE, pp. 359-362, (2009).
"Remote Desktop Protocol Performance", Presentation and Hosted Desktop Virtualization Team, MICROSOFT, pp. 1-17, (Oct. 13, 2008).
USPTO Library log for NPL search, pp. 1-6 (Accessed on Feb. 26, 2022).
Notice of Allowance dated Mar. 14, 2022 in U.S. Appl. No. 16/698,483, 8 pages.
Zimmerman, Johannes; Notice of Allowance for U.S. Appl. No. 16/698,483, filed Nov. 27, 2019, mailed Mar. 14, 2022, 13 pgs.
Zimmerman, et al.; Non-Final Office Action for U.S. Appl. No. 17/666,419, filed Feb. 7, 2022, mailed Jun. 29, 2023, 30 pgs.
Baratto, et al.; "THINC: A Virtual Display Architecture for Thin-Client Computing"; Department of Computer Science, Columbia University, NY, NY, 2005, 14 pgs.
Periasamy, et al.; "A Common Palette Creation Algorithm for Multiple Images with Transparency Information"; IEEE International Conference on Advances in Computing, Control and Telecommunication Technologies, 2009, 4 pgs.
Ma, et al.; "Advanced Screen Content Coding Using Color Table and Index Map"; IEEE Transactions on Image Processing, vol. 23, No. 10, Oct. 2014, 14 pgs.
Bosnjakovic, Andrija; First Office Action for Chinese Application No. 201910778663.9, filed Aug. 22, 2019, mailed Sep. 20, 2023, 11 pgs.
Bosnjakovic, Andrija; Non-Final Office Action for U.S. Appl. No. 17/878,465, filed Aug. 1, 2022, mailed Nov. 22, 2023, 28 pgs.
Periasamy, et al.; "A Common Palette Creation Algorithm for Multiple Images with Transparency Information," 2009 International Conf on Advances in Computing, Control, and Telecommunication Technologies, 2009, 4 pgs.
Zimmermann, Johannes; Final Office Action for U.S. Appl. No. 17/666,419, filed Feb. 7, 2022, mailed Jan. 16, 2024, 13 pgs.
Bosnjakovic, Andrija; Second Office Action for Chinese Patent Application No. 201910778663.9, filed Aug. 22, 2019, mailed Mar. 30, 2024, 8 pgs. English Abstract Included.
Zimmermann, Johannes; Notice of Allowance for U.S. Appl. No. 17/666,419, filed Feb. 7, 2022, mailed Mar. 26, 2024, 14 pgs.
Bosnjakovic, Andrija; Notice of Allowance for U.S. Appl. No. 17/878,465, filed Aug. 1, 2022, mailed Apr. 16, 2024, 12 pgs.

* cited by examiner

INDIVIDUAL APPLICATION WINDOW STREAMING SUITABLE FOR REMOTE DESKTOP APPLICATIONS

CROSS-REFERENCE TO RELATED APPLICATIONS

This application is a continuation of U.S. application Ser. No. 16/441,578 filed Jun. 14, 2019, which claims priority to U.S. Provisional Patent Application No. 62,751,366, filed on Oct. 26, 2018. Each of these applications is incorporated by referenced herein in its entirety.

BACKGROUND

Conventional approaches for remote computing may provide a user with access to software running on a remote computing device (e.g., a server) by streaming an entire desktop of the remote computing device to a local device of the user (e.g., a client). As a result, the user of the local device may only have the option of viewing a representation of the entire remote desktop on the local device, either within a single window or as a full-screen view. To access the software of the remote computing device, the user must interact with the entire remote desktop being streamed on the local device of the user. However, a user may be interested in viewing and/or interacting with select windows or only a subset of the entire desktop of the remote computing device. In such scenarios, these conventional approaches that produce the entire remote desktop unnecessarily consume excess bandwidth, processing power, and energy to generate and transmit the remote desktop to the local device. Moreover, security concerns may arise in cases where a user should not be granted full access to an entire remote desktop, but only to a certain set of remote applications.

Additionally, conventional systems may not offer seamless integration between the remote desktop and the local desktop of the local device. For example, where the remote desktop is streamed into a window, the window that displays the remote desktop may allow some level of interaction between the remote and local desktops (e.g., drag and drop functionality), but may always separate application windows from within the remote desktop from application windows of the local desktop. As another example, when interacting with any application of the remote desktop, the entire remote desktop window may be displayed above (over) or below (under) each of the application windows in the Z-order of the local desktop. Further, while some systems may stream a client area of a single application window, the non-client area (the graphical content beyond what is directly contained in the client area, such as a window frame, and any functionality provided through user interface widgets on the window frame) may not be made available to the client desktop.

SUMMARY

Amongst other aspects, the present disclosure relates to individual application window streaming for remote desktop applications. In contrast to conventional systems that stream an entire remote desktop to a local desktop of a local device, disclosed approaches allow for any number of application windows and/or other desktop elements (e.g., pop-up notifications) of the remote desktop to be streamed to the local desktop without including the entire remote desktop in the stream. To do this, window visuals and corresponding window properties of each relevant window of the remote desktop are captured and encoded into a video stream of the network stream. Data used to represent the irrelevant and/or unselected windows or other desktop areas may be minimized. Further, the video stream comprising the window visuals and window metadata representative of the window properties may be transmitted to the local device.

Further aspects of the disclosure provide for the transfer of per-pixel transparency information (alternatively referred to as "alpha information") using video codecs that do not provide an alpha channel. For example, alpha information of visuals (e.g., window visuals) may be transcoded into the supported channels of a video stream to generate samples of a supported color space that are representative of the alpha information.

The present disclosure may further provide for the transfer of visuals (e.g., window visuals) over virtual frames that may be stored in any number of video frames of one or more video streams. The visuals may be split into two-dimensional (2D) pages of a virtual frame, with each of the 2D pages being a fraction of the size of video frames of the video stream(s). The virtual frame may be encoded to the video frames of the video stream(s) and later reconstructed in accordance with a page table.

BRIEF DESCRIPTION OF THE DRAWINGS

The present systems and methods for individual application window streaming suitable for remote desktop applications is described in detail below with reference to the attached drawing figures, wherein.

DETAILED DESCRIPTION

Figure 1:
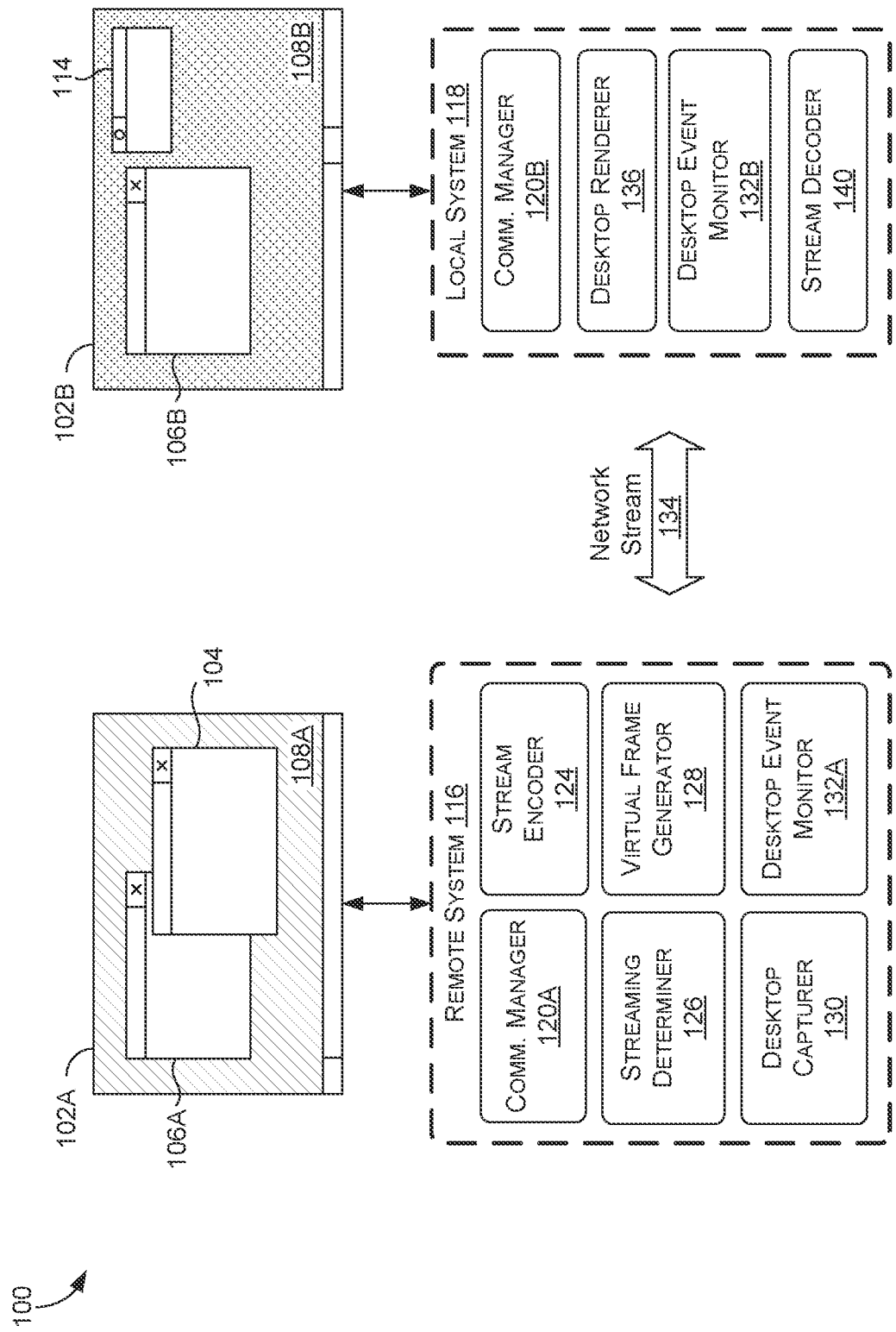
FIG. 1 is a diagram of an example desktop streaming system, in accordance with some embodiments of the present disclosure.

Systems and methods are disclosed related to individual application window streaming suitable for remote desktop applications. More specifically, systems and methods are disclosure related to—in lieu of streaming an entire remote desktop to a local desktop—streaming one or more application windows and/or other desktop elements of the remote desktop to the local desktop.

In contrast to conventional approaches, disclosed approaches allow for any number of application windows or other desktop elements of a remote desktop to be streamed to the desktop of a local device without including the entire remote desktop in the stream. To do this, window visuals and corresponding window properties of each relevant window of the remote desktop may be captured and encoded to a video stream of the stream (e.g., using a standard such as Real-Time Transport Protocol (RTP) or a proprietary protocol type). Data used to represent the irrelevant and/or unselected windows or other desktop areas may be minimized, such as by replacing the data with lower entropy data (e.g., black pixel data) that may be highly compressed in the video stream and/or replacing those areas with other visual content. Further, the video stream comprising the window visuals and window metadata representative of the window properties may be transmitted to the local device. By streaming only a set of particular application windows and/or other desktop elements to a local device, as well as leveraging video streaming technologies, the disclosed approaches require less bandwidth, processing, and power compared to conventional systems. In addition, in contrast to security concerns present in conventional systems, such as those described herein, the approaches of the present disclosure offer security improvements, by excluding from the stream application windows, desktop elements, or visuals that are sensitive in nature, for example.

Window visuals and window properties of one or more application windows may be received and decoded from the stream to create local window visuals on the local desktop. Using the received window properties, the decoded window visuals may be rendered and displayed on the local desktop in a proxy window for each of the corresponding remote windows. In one or more embodiments, a proxy window may include decoded window visuals that extend beyond what is in a client area. The decoded window visuals and window properties of any number of application windows may be received in a single video stream or multiple video streams, over a single network stream, while allowing for interaction with the individual proxy windows, as if they were native to the local desktop. Thus, in contrast to conventional systems, by rendering a proxy window on the local desktop from the window visuals and window properties, disclosed approaches allow the application windows to be seamlessly integrated into the local desktop.

In some examples, a user or the system may determine at least one application window of a remote desktop of interest to be streamed to a local desktop of a local device. The portion of the remote desktop not identified or otherwise determined to be of interest may be excluded from or minimized in the stream. For example, the unselected portion of the remote desktop may be filtered out or converted to a minimal representation using lower entropy data from a first (e.g., captured) visual surface in order to generate a second (e.g., to be transmitted) visual surface that still includes fully represented window visuals of the portions of the remote desktop that are determined to be of interest. The second visual surface may then be encoded to the stream and transmitted to the local device. In some examples, the portion(s) of the remote desktop may be removed by applying a stencil to the first (e.g., captured) visual surface to remove, or overwrite, at least some of the portion(s) of the remote desktop while retaining window visuals of relevant windows and other desktop elements. Removing and/or modifying a portion of the remote desktop so that it is not transmitted in the stream or transmitted using less bandwidth and processing power may also provide increased security in addition to bandwidth and processing savings by both the remote computing device encoding the stream and the local device decoding the stream.

Further aspects of the disclosure may provide for the transfer of per-pixel transparency information (alternatively referred to as "alpha information") using video codecs (e.g., H.264) that do not define an alpha channel. For example, during an encoding phase at the remote computing device, alpha information of window visuals of an application window may be transcoded into the supported channels of a video stream to generate samples of supported color space that are representative of the alpha information. Additionally, triplets (blocks of 1×3 or 2×3) of the alpha samples may be attached to the video stream as a single sample in the color space. In some non-limiting examples, the color space may be a Luma-Chrominance (YUV) color space or a Red Green Blue (RGB) color space. By transcoding alpha information to a supported color space, transparency information for application windows may be transported in a video stream that otherwise may not support the transparency information.

Additional disclosed approaches may provide for a header of a video stream (e.g., using an RTP header extension for a stream transported using RTP) to be used to transmit window properties of at least one application window to a local device. For example, the window properties may be represented by window metadata that is included in the header. By encoding the window properties in the header, the window properties and window visuals may be transported in the same video stream—thereby resulting in bandwidth savings and reduced system complexity, without requiring additional dedicated streams.

In further examples, window metadata representative of the window properties may be delta-encoded in a stream for transmission to the local device. The window metadata may be transmitted in the stream using structured byte-wise diffs, where structured metadata is processed member-by-member, byte-by-byte, to delta-encode the window properties of an application window. Sending delta information (e.g., changes in the window properties) rather than all the current window property information in the stream may allow for significantly reduced bandwidth utilization and may reduce processing requirements because less data needs to be sent and processed to convey the same information.

To encode window visuals of application windows into a video stream, disclosed approaches may include splitting the window visuals of at least one application window into 2D pages of a virtual frame—with each of the 2D pages being a fraction of a size of frames of a video stream. The virtual frame may be encoded to the frames of the stream. In some examples, the virtual frames may be used in conjunction with an applied stencil. For example, the stencil may be used to generate a second (e.g., to be transmitted) visual surface that may then be split into the 2D pages of the virtual frame. In further examples, the stencil may or may not be used, and a set of application windows and/or other desktop elements may be captured directly (e.g., from a remote operating system), and then split into the 2D pages of the virtual frame. Streaming "paged" window visuals may simplify the logic applied to the placement of multiple windows into a single transmitted surface and their later reconstruction from that surface and may also avoid the usage of complex bin-packing algorithms. In some examples, this approach may be used to transmit one or more portions of the 2D pages rather than complete window visuals in every frame, which may allow for balancing workload and bandwidth requirements. Further, this approach may be used to mitigate video frame size limitations of video encoders used to encode the video stream.

Now referring to FIG. 1, FIG. 1 is a diagram of an example desktop streaming system 100, in accordance with some embodiments of the present disclosure. It should be understood that this and other arrangements described herein are set forth only as examples. Other arrangements and elements (e.g., machines, interfaces, functions orders, and groupings of functions etc.) may be used in addition to or instead of those shown, and some elements may be omitted altogether for the sake of clarity. Further, many of the elements described herein are functional entities that may be implemented as discrete or distribute components or in conjunction with other components, and in any suitable combination and location. Various functions described herein as being performed by one or more entities may be carried out by hardware, firmware, and/or software. For instance, some functions may be carried out by a processor executing instructions stored in memory.

The desktop streaming system 100 may include, for example, a remote system 116 and a local system 118. The remote system 116 may include, for example, a communications manager 120A, a stream encoder 124, a streaming determiner 126, a virtual frame generator 128, a desktop capturer 130, and a desktop event monitor 132A. The local system 118 may include, for example, a communications manager 120B, a desktop renderer 136, a desktop event monitor 132B, and a stream decoder 140.

As an overview, the desktop streaming system 100 may be used to stream one or more portions of a remote desktop 102A to a local desktop 102B. For example, the remote system 116 may capture desktop visuals of the remote desktop 102A and associated desktop properties for inclusion in a network stream 134. Desktop visuals and desktop properties may be included in desktop data that may be associated with a particular portion or element of a desktop. Desktop visuals of the portion of the desktop may refer to visual content, and a desktop property may refer to data that is descriptive of the portion of the desktop (e.g., dimensions, location, etc.). In various examples, the portion of the desktop may be an application window—such as an application window 106A—in which case the desktop data may be referred to as window data, the desktop visuals may be referred to as window visuals, and the desktop properties may be referred to as window properties. In some embodiments, to capture the desktop visuals, the remote system 116 captures the remote desktop 102A and applies a stencil to the captured remote desktop 102A to remove at least some of a desktop background 108A (e.g., by overwriting corresponding desktop visuals with lower entropy data) and/or other extraneous information while retaining desktop visuals of one or more application windows—such as the application window 106A. The local system 118 may use the desktop visuals and desktop properties from the network stream 134 to render the portion(s) of the remote desktop 102A on the local desktop 102B. For example, for the application window 106A, the local system 118 may render a proxy window 106B on the local desktop 102B using corresponding window visuals and window properties from the network stream 134. The proxy window 106B may be integrated into the local desktop 102B with one or more native application windows—such as a native application window 114. Unselected portions of the desktop, such as application window 104, will be left out from the transmitted stream.

The communications manager 120A of the remote system 116 may be configured to manage communications provided by the remote system 116, such as in the network stream 134 of the desktop streaming system 100 (e.g., comprising data representative of window visuals and window properties of at least one application window). The communications manager 120A of the remote system 116 may also be configured to manage communications provided to the remote system 116 (e.g., comprising data representative of window events for application window(s) of the remote desktop 102A, which may also be in the network stream 134). The streaming determiner 126 may be configured to determine at least one application window and/or other portions of the remote desktop 102A to include in the network stream 134. The desktop capturer 130 may be configured to capture the portion(s) of the remote desktop 102A, such as window visuals and corresponding window properties of the at least one application window (e.g., the application window 106A). The stream encoder 124 may be configured to encode data representative of the portions of the remote desktop, such as the window visuals and corresponding window properties of the at least one application window to the network stream 134 (e.g., a video stream of the network stream 134). In some embodiments, the virtual frame generator 128 may be used to split the window visuals of the at least one application window into two-dimensional (2D) pages of a virtual frame for inclusion in the network stream 134. The desktop event monitor 132A may be configured to identify desktop events, such as a window creation event or a window destruction event associated with the remote desktop 102A (e.g., indicated by user input to the local desktop 102B). The desktop event monitor 132A may be further configured to update a list of application windows to include in the network stream 134 based, at least in part, on the identified desktop events.

The communications manager 120B of the local system 118 may be configured to manage communications provided by the local system 118—such as in the network stream 134 of the desktop streaming system 100—and/or provided to the local system 118. The stream decoder 140 may be configured to decode data from the network stream 134, such as data representative of desktop visuals and desktop properties. The desktop renderer 136 may be configured to render, on the local desktop 102B, the portion(s) of the remote desktop 102A included in the network stream 134 using the decoded data. For example, for each application window, the desktop renderer 136 may render (e.g., generate) a corresponding proxy window using the window properties of the application window so that they may appear on the local desktop 102B as they do on the remote desktop 102A. The desktop event monitor 132B may be configured to identify events associated with the remote desktop 102A, such as the window creation event or the window destruction event (e.g., when user input selects a control element to close a proxy window).

Figure 11:
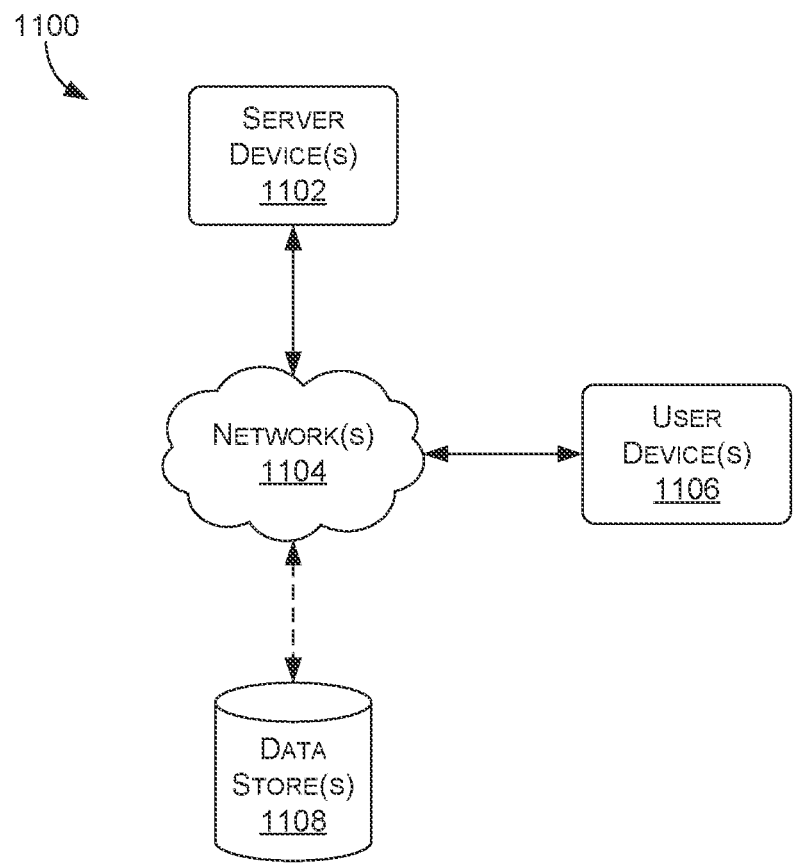
FIG. 11 is an example operating environment of in accordance with some embodiments of the present disclosure.

The components of FIG. 1 may generally be implemented using any combination of a user device(s) 1106 and/or a server device(s) 1102 of FIG. 11. In some examples, the remote system 116 may be implemented on one or more of the server devices 1102 and the local system 118 may be implemented on the user device 1106. In other examples, both the local system 118 and the remote system 116 may be implemented on separate user devices 1106. The remote system 116 and/or the local system 118 may each be provided via multiple devices arranged in a distributed environment that collectively provide the functionality described herein or may each be embodied on a single device. Thus, while some examples used to describe the desktop streaming system 100 may refer to particular devices and/or configurations, it is contemplated that those examples may be more generally applicable to the potential combinations of devices and configurations described above.

As mentioned herein, the communications manager 120A and/or the communications manager 120B may be configured to manage communications (e.g., of the network stream 134) received by the remote system 116 or the local system 118 of the desktop streaming system 100 and/or provided by the remote system 116 or the local system 118 of the desktop streaming system 100. The communications manager 120A and/or the communications manager 120B may also be configured to manage communications within their respective systems. In such examples, one or more of the communications may be transmitted between components of a computing device 1200 over a bus 1202 of FIG. 12.

Where a communication is received and/or provided as a network communication, the communications manager 120A and/or 120B may include a network interface that may use one or more wireless antenna(s) and/or modem(s) to communicate over one or more networks.

The streaming determiner 126 of the remote system 116 may determine at least one application window or other portion of the remote desktop 102A to include in the network stream 134 to the local desktop 102B. This determination may be based on user input and/or other user-defined settings and/or system-defined information, such as a configuration file. For example, a user may use a graphical user interface (GUI) via the remote system 116 and/or the local system 118 to provide input that selects which application(s) and/or application windows associated with the application(s) to stream from the remote desktop 102A to the local desktop 102B. For example, a user may select an application to indicate to the streaming determiner 126 to automatically include each application window associated with that particular application in the network stream 134. Additionally or alternatively, user input may individually select specific application windows for the streaming determiner 126 to include in the network stream 134. In some examples, only those application windows selected by the user may be streamed to the local desktop 102B and/or be displayed on the local desktop 102B.

Additionally, at least some of the settings regarding which application windows and/or other portions of the remote desktop 102A to include in the network stream 134 may be system-defined. For example, the streaming determiner 126 may determine which application windows and/or other desktop elements are associated with the remote desktop 102A. To do so, the streaming determiner 126 may query (e.g., using one or more system API calls) a service of an operating system or metadata maintained by the operating system that hosts the remote desktop 102A (e.g., a window manager). The streaming determiner 126 may or may not be part of the host operating system depending on the embodiment. The streaming determiner 126 may use the results of the query to determine one or more application windows to stream. For example, the results of the query may indicate whether an application window is visible on the remote desktop 102A, and the streaming determiner 126 may stream the application window based at least in part on the application window being visible. As an example, the streaming determiner 126 may decide to only include visible application windows (and/or window visuals thereof) in the network stream 134 to the local desktop 102B.

The desktop capturer 130 of the remote system 116 may be configured to capture desktop visuals of the remote desktop 102A and corresponding desktop properties. For example, the desktop capturer 130 may capture the desktop visuals and corresponding desktop properties for each portion of the remote desktop 102A that the streaming determiner 126 determines to include in the network stream 134.

Figure 2A:
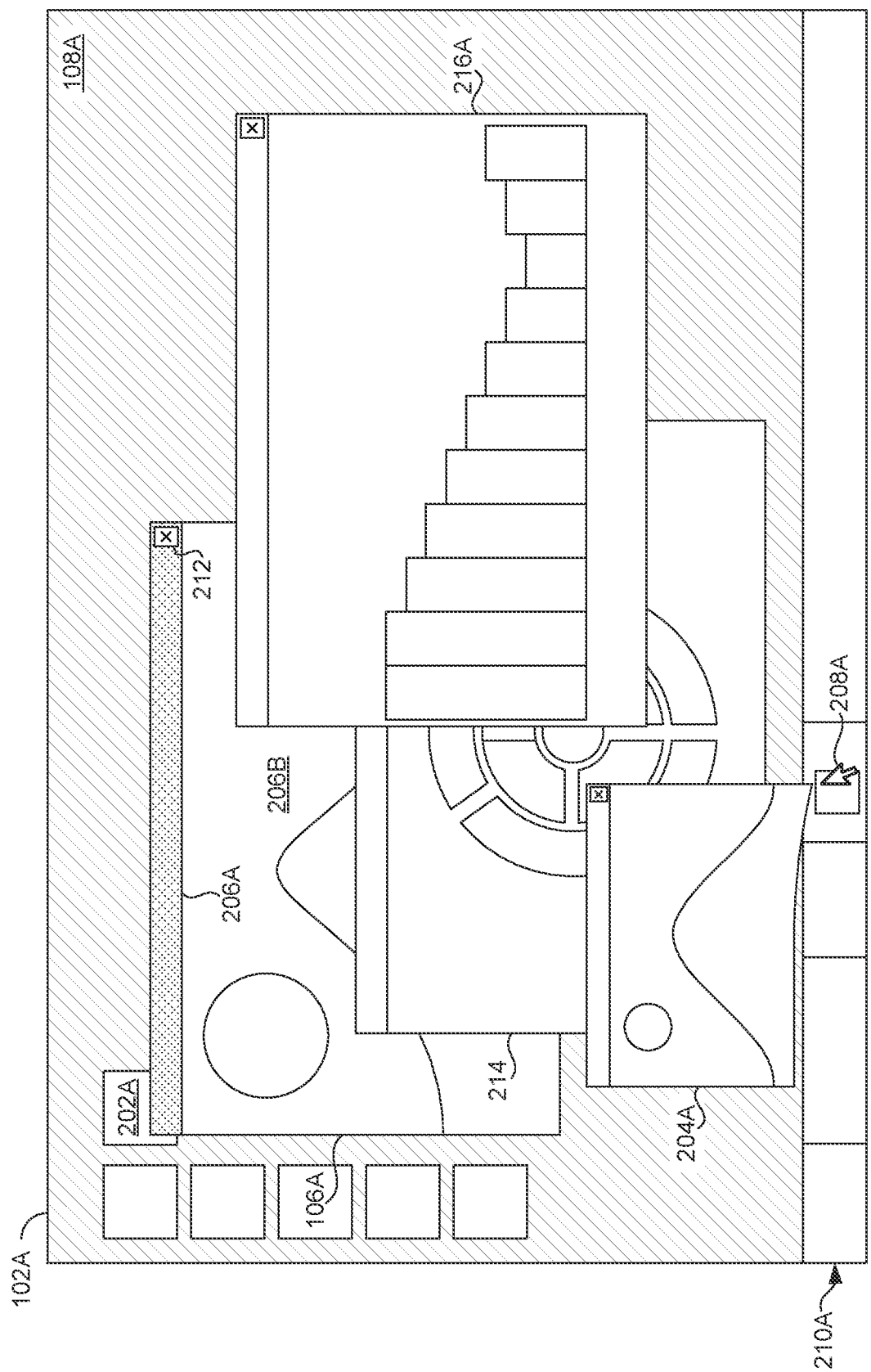
FIG. 2A is an example of a remote desktop, in accordance with some embodiments of the present disclosure.

FIG. 2A is an illustration including an example of the remote desktop 102A, in accordance with some embodiments of the present disclosure. Desktop visuals of the remote desktop 102A which may be captured by the desktop capturer 130 may include visuals of windows (e.g., of the application window 106A and the application window 216A), icons (e.g., an icon 202A), taskbars (e.g., a taskbar 210A), command buttons (e.g., a command button 212), system trays, start buttons, start menus, shortcuts, cursors (e.g., a cursor 208A), window previews (e.g., a preview window 204A), desktop backgrounds (e.g., the desktop background 108A), and/or other elements that may be present on the remote desktop 102A. Window visuals for an application window may include text or graphics displayed as outputs in a client area of an application window, such as a client area 206B of the application window 106A. Additionally, window visuals for an application window may include text or graphics of one or more system areas or frame areas of an application window, such as a system area 206A of the application window 106A. Examples of a system area or a frame area include at least one of: a title bar, a menu bar, a window menu, a minimize button, a maximize button, a sizing border, and/or a scrolling bar.

Corresponding desktop properties for visuals of windows, icons, taskbars, command buttons, system trays, start buttons, start menus, shortcuts, desktop backgrounds, and/or other visual elements may include one identifier and one or more of: a caption, geometry, style, location (e.g., coordinates), window mode (e.g., full screen, windowed, etc.), and/or other property associated with the portion of the remote desktop. In some examples, a desktop property may indicate a type of the desktop visuals, such as whether the desktop visuals correspond to an application window, window preview, etc.

The desktop capturer 130 may capture the corresponding desktop properties for desktop visuals from a remote desktop operating system, service, desktop manager software, file, memory, window manager, application, and/or other suitable source. For example, one or more window properties of an application window(s) captured for the network stream 134 may correspond to one or more window properties used to compose the application window(s) on the remote desktop 102A. As further examples, one or more of the desktop properties may be determined based at least in part on computer vision and/or object tracking algorithms (e.g., performed on a screen capture of the remote desktop 102A).

In some examples, the desktop capturer 130 may capture at least some of the desktop visuals into one or more visual surfaces and encode the one or more visual surfaces to the network stream 134. As an example, one of the visual surfaces may be a remote desktop surface that is representative of the remote desktop 102A, such as a screen shot or screen capture of at least a portion of the remote desktop 102A and/or a display of a remote device that displays the remote desktop 102A. As further examples, one or more of the visual surfaces may be a desktop composition surface that is representative of desktop visuals used by the operating system and/or window manager to compose the remote desktop 102A. As an example, a desktop composition surface may include at least a portion of an individual application window and/or other visual element. For example, a desktop composition surface for the application window 106A may include the client area 206B and the system area 206A.

The desktop capturer 130 may use the streaming determiner 126 to determine at least a portion of the remote desktop 102A to exclude from the network stream 134. For example, the desktop capturer 130 may use the streaming determiner 126 to determine at least one application window and/or another portion of the remote desktop 102A to exclude from the network stream 134. In the example of FIG. 2A, this may include the remote desktop background 108A and an application window 214. Further, the desktop capturer 130 may determine at least some of the portion(s) of the remote desktop 102A to remove from the visual surface (e.g., a representation of the remote desktop 102A). In various embodiments, the portions of the remote desktop 102A that the desktop capturer 130 removes do not include the portion(s) of the remote desktop 102A that the streaming determiner 126 determines or selects to include in the network stream 134. As a result, the other visual surface(s) may include desktop visuals of portions of the remote desktop 102A that the streaming determiner 126 determines to include in the network stream 134 without at least some of the other portions of the remote desktop 102A. The stream encoder 124 may encode the other visual surface(s) in the network stream 134.

In some examples, the desktop capturer 130 removes at least some of the portion(s) of the remote desktop 102A from the visual surface(s) using at least one stencil. For example, the desktop capturer 130 may apply a stencil to a visual surface (e.g., a remote desktop surface) to remove (e.g., overwrite) at least some visual content resulting in a visual surface that does not include the removed visual content. A stencil may identify—on a visual surface—which portions of the remote desktop 102A are to be included in the network stream 134 and which portions of the remote desktop are to be excluded from the network stream 134. The stencil may be used to remove and replace at least some image data (e.g., pixel data) of non-session areas (those areas that do not correspond to a portion of the remote desktop 102A to be included in the network stream 134) with other image data. The desktop capturer 130 may construct the stencil, for example, by traversing all visible windows of all streamed processes as specified by the streaming determiner 126.

In some examples, at least some of the image data representative of an image of the remote desktop 102A may be replaced with at least some image data representative of another image. For example, image data representative of the desktop background 108A (FIG. 1) may be replaced with image data representative of a desktop background 108B. Additionally, or alternatively, at least some of the image data of non-session areas may be replaced with lower entropy image data—such as zero or near-zero entropy data. Examples of zero or near-zero entropy data may include data representative of a common pixel color, such as black. Generally, any area having a solid fill color may comprise low entropy data. For example, the desktop background 108A may be replaced with image data representative of black pixels, and the desktop background 108B, shown in FIG. 1, may be a native desktop background of the local desktop 102B. Reducing the entropy of image data in one or more regions of a visual surface(s) that are not of interest for display on the local desktop 102B may allow the stream encoder 124 to compress the visual surface(s) to a smaller size, reducing the bandwidth required to stream the remote desktop 102A to the local desktop 102B. For example, the desktop renderer 136 may not render image data from the network stream 134 that corresponds to the non-session areas of the remote desktop 102A on the local desktop 102B. The desktop renderer 136 may instead render other image data or may not render any image data in those non-session areas; in such cases, the operating system of the local desktop may render non-session areas when the desktop renderer 136 is not part of the operating system.

Figure 3:
FIG. 3 is an illustration used to describe examples of generating visual surfaces for inclusion in a network stream, in accordance with some embodiments of the present disclosure.

FIG. 3 is used to describe examples of the desktop capturer 130 generating visual surfaces for inclusion in the network stream 134 using stenciling and/or other approaches. Referring now to FIG. 3, the top row is an illustration including examples of remote desktop surfaces 300, in accordance with some embodiments of the present disclosure; the bottom row is an illustration including examples of visual surfaces 340 which may correspond to the remote desktop surfaces 300 of FIG. 3, in accordance with some embodiments of the present disclosure. A remote desktop surface 302, a remote desktop surface 304, a remote desktop surface 306, and a remote desktop surface 308 may correspond to a first, second, third and fourth remote desktop, respectively. A visual surface 332, a visual surface 334, a visual surface 336, and a visual surface 338 may be generated by the desktop capturer 130 from the remote desktop surface 302, the remote desktop surface 304, the remote desktop surface 306, and the remote desktop surface 308, respectively, for inclusion in the network stream 134. The visual surface 332, the visual surface 334, the visual surface 336, and the visual surface 338 may represent examples of full-screen surfaces of the remote desktop 102A and/or may represent examples of full-screen surfaces for display on the local desktop 102B.

The remote desktop surface 302 includes window visuals for application windows 312, 314, and 316. As an example, the application windows 312, 314, and 316 may correspond to the same application, with the application window 312 comprising a primary work area and the application windows 314 and 316 comprising toolbars used to select tools for interacting with the primary work area. In some examples, the streaming determiner 126 selects each of the application windows 312, 314, and 316 for inclusion in the network stream 134. As the application windows 312, 314, and 316 fill the entire remote desktop 102A, the visual surface 332 may be the same as or substantially similar to the remote desktop surface 302 (e.g., the same application windows in their corresponding locations, but optionally without one or more system desktop elements, such as a mouse cursor, taskbar, etc.). The remote desktop surface 304 includes a desktop region 310 and application windows 318 and 320. The application window 320 may correspond to a window of an application, such as an inbox of an email application, and the application window 318 may correspond to a different application, such as a media player, or it may be another application window of the application that corresponds to the application window 320. The desktop region 310 may include desktop visuals of at least some of the desktop background 108A and optionally of other elements that are for presentation over the desktop background 108A, such as desktop icons, text, a system menu, and/or a system taskbar.

In some examples, the streaming determiner 126 selects each of the application windows 318 and 320 for inclusion in the network stream 134. The desktop capturer 130 may, as a result, apply a stencil to the remote desktop surface 304 to generate the visual surface 334, where image data corresponding to the desktop region 310 is replaced with lower entropy image data (e.g., representative of black pixels) and/or other image data (e.g., representative of a different image) representative of a region 330. The remote desktop surface 306 includes an application window 322 in a full-screen mode. Thus, the visual surface 336 may be the same as or substantially similar to the remote desktop surface 306. The remote desktop surface 308 includes only the desktop region 310. Thus, the desktop capturer 130 may apply a stencil to the remote desktop surface 308 to generate the visual surface 338, where image data corresponding to the desktop region 310 is replaced with lower entropy image data (e.g., representative of black pixels) and/or other image data (e.g., representative of a different image) representative of the region 330. In some examples, the stencil may not be used and the desktop capturer 130 may generate the visual surface 338 without using and/or capturing the remote desktop surface 308. This may occur, for example, when the streaming determiner 126 determines that the remote desktop 102A does not include any desktop visuals for display on the local desktop 102B.

In some examples, the remote desktop surfaces 302, 304, 306, and 308 correspond to multiple displays of the same remote system 116. For example, each remote desktop surface may be rendered for a respective portion of the remote desktop visible on a respective monitor presented by the remote system 116 using a remote user device. Desktop visuals and desktop properties for each portion of the remote desktop may be included in the network stream 134 (e.g., in the same video stream) or may have separate streams (e.g., separate video streams per display with per-stream window visuals, window properties, and timing information to enable client-side window composition from asynchronous video streams). Further, the remote desktop surfaces 302, 304, 306, and 308 may be one remote desktop surface and/or the visual surfaces 332, 334, 336, and 338 may be one visual surface, by way of example. In addition, while the visual surfaces 332, 334, 336, and 338 are described as being generated using stencils applied to the remote desktop surfaces 302, 304, 306, and 308, any suitable approach may be used for various embodiments. For example, any number of remote desktop surfaces and/or stencils may be used to generate a visual surface for inclusion in the network stream 134.

Additionally, any number of intermediate visual surfaces may be used to generate the visual surface. In some examples, any of the visual surfaces 332, 334, 336, and 338 may be generated by the desktop capturer 130 without use of a remote desktop surface or portion thereof. For example, the desktop capturer 130 may generate the visual surfaces 332, 334, 336, and 338 by compositing image data for different portions of the remote desktop 102A that are to be included in the network stream 134 (e.g., where the desktop capturer 130 has accesses to individual surfaces the operating system uses to composite the remote desktop 102A for display).

The stream encoder 124 may be configured to encode data representative of the portions of the remote desktop, such as the desktop visuals and corresponding desktop properties of the at least one application window to the network stream 134. To do so, the stream encoder 124 encodes the captured desktop visuals to the network stream 134. For example, the stream encoder 124 may encode the any of the various visual surfaces 332, 334, 336, and 338 into network stream 134. In one or more embodiments, the visual surface 332 may be encoded into a single video frame. However, in some cases, the visual surface 332 may be encoded into a virtual frame using the virtual frame generator 128, which may use the visual surface 332 to generate multiple video frames as described with respect to FIG. 5. As another example, the desktop capturer 130 may use the virtual frame generator 128 to capture the desktop visuals that correspond to the visual surface 332 into video frames of a virtual frame without first capturing the image data to a single visual surface.

The stream encoder 124 may be configured to encode the desktop properties corresponding to the desktop visuals into the network stream 134 as desktop metadata representative of the desktop properties for the desktop visuals. The stream encoder 124 may encode the desktop properties on a per-frame basis in association with corresponding desktop visuals. For example, the stream encoder 124 may associate the desktop visuals with corresponding desktop properties using temporal and/or spatial information, such as with associated timestamps, coordinates, frames, and/or frame identifiers. Each video frame may be annotated by a timestamp, which may be used by the desktop renderer 136 of the local system 118 to update the desktop state and desktop visuals from asynchronous video streams of the network stream 134 (e.g., for multi-monitor use cases). In some examples, the stream encoder 124 encodes the window properties to header data of network communications of the video stream. For example, the desktop metadata may be included in a header extension of the transport protocol used to encode the network stream 134. Thus, the desktop metadata may be transported along with the desktop visual data, without requiring a separate stream or connection.

The desktop metadata may be transmitted in the network stream 134 using delta-encoding of the desktop properties of the desktop elements. To reduce network bandwidth consumption, only metadata that has been changed since the last packet update may be sent. To prevent losses, a reference invalidation scheme may be employed. Likewise, to prevent protocol breaks, one or more future-proofing mechanisms (e.g., serialized, structured byte-wise diffs, etc.) may be implemented. For example, the stream encoder 124 may delta-encode the desktop properties using, for example and without limitation, structured byte-wise diffs that may bring significant bandwidth savings and employ a versioning scheme for forward/backward compatibility.

Embodiments of the present disclosure provide approaches for streaming window metadata on a per-frame basis that allows forward/backward-compatible delta-coding of "generic" data. The stream encoder 124 may implement these approaches in some embodiments. In one or more embodiments, data may be described as "generic" if it uses generic C/C++ data type definitions, e.g., to avoid additional dependencies and/or redundant data type representations. The solutions described herein may be forward/backward-compatible such that clients can understand outdated or disregard future data definitions of older/newer servers. Delta-coding may be used to reduce bandwidth requirements of rather low-entropy window metadata.

Reducing the amount of data transported over a network may be solved by diff/patch-based delta-coding. Since the efficiency of a simple "serialize, then send byte-wise diff" approach may not scale well for structured data involving entries/members of variable size, embodiments may leverage C++ templates to flatten data structures to entry/member/byte-wise diffs along template function call hierarchies: generic template function definition which calls delegate implementations for generic/custom types; specialized implementations for arithmetic types using byte-wise diff/patch; specialized (partial) implementations for essential containers (e.g., string, vector, map); specialized delegate implementations for generic/custom types which simply enumerate members to diff/patch implementations of the above basic types.

These approaches may also support polymorphisms and may scale to arbitrarily structured data either by limiting data types to the supported ones, or by adding specialized diff/patch implementations. Both the described byte-wise diff and struct-diff implementations may employ additional optimizations applicable to diff string size and execution speed, in addition to the features described.

Regarding forward/backward-compatibility, since enhancing structs by struct size entries may enable skipping of future/unknown entries when merging a diff string, entry deprecation is virtually for free: by simply never changing the value of a default-constructed entry, this entry will always account as an incremented skip count in a diff string.

Further aspects of the disclosure provide approaches that may be used for the transfer of transparency information for visuals, such as desktop visuals, using image data of a video stream, even where a video codec used to encode the video stream does not explicitly support an alpha channel. The stream encoder 124 may use these approaches to encode the desktop visuals of the network stream 134. For example, while a system desktop is typically opaque, individual windows and/or other desktop elements may be at least partially transparent. To illustrate the forgoing, the system area 206A and/or the client area 206B of the application window 106A may be semi-transparent, such as when the application window 106A is not an active window. As further examples, portions of desktop visuals may be completely transparent. Such content includes windows of non-rectangular shape that typically use per-pixel transparency to achieve such shapes. Common use cases include game launchers or splash screens of unusual and/or asymmetrical shape, and the rounded rectangle shape of restored application windows.

The transfer of such transparency information may require a remote application streaming solution to stream per-pixel transparency information (e.g., using an alpha channel). However, contemporary video codecs, such as H.264 (AVC), do not support an alpha channel. Disclosed approaches may provide for alpha information of desktop visuals of desktop elements to be transcoded to a color space of a video stream to store alpha samples that are representative of the alpha information in the color space. In various examples, the color space may be a Luma-Chrominance (YUV) color space or a Red Green Blue (RGB) color space. Disclosed approaches may enable RGBA streaming using, for example, an alpha-agnostic YUV444/420 video streaming pipeline by attaching appropriately converted alpha information to YUV444/420 video frames—either in the RGB or YUV space—and having the underlying video codec process alpha values, or samples, as regular RGB or YUV values. However, any suitable streaming format and color spaces may be employed without departing from the scope of the present disclosure.

In various embodiments, each alpha sample may define transparency information for a particular pixel. Alpha samples may be stored in one or more color channels that define the color space for the video stream, along with color samples that are typically stored in those color channels (e.g., RGB channels or YUV channels). In some examples, when rendering the image data stored in the video stream, an image renderer (e.g., the desktop renderer 136 of the local system 118) may use a decoder (e.g., the stream decoder 140 of the local system 118) that is capable of distinguishing between the color samples and the alpha samples. Further, the decoder may be capable of determining which alpha samples are associated with which color samples in order to render a corresponding pixel. These associations, for example, may be implicit in the locations of the alpha samples relative to the color samples.

Figure 4A:
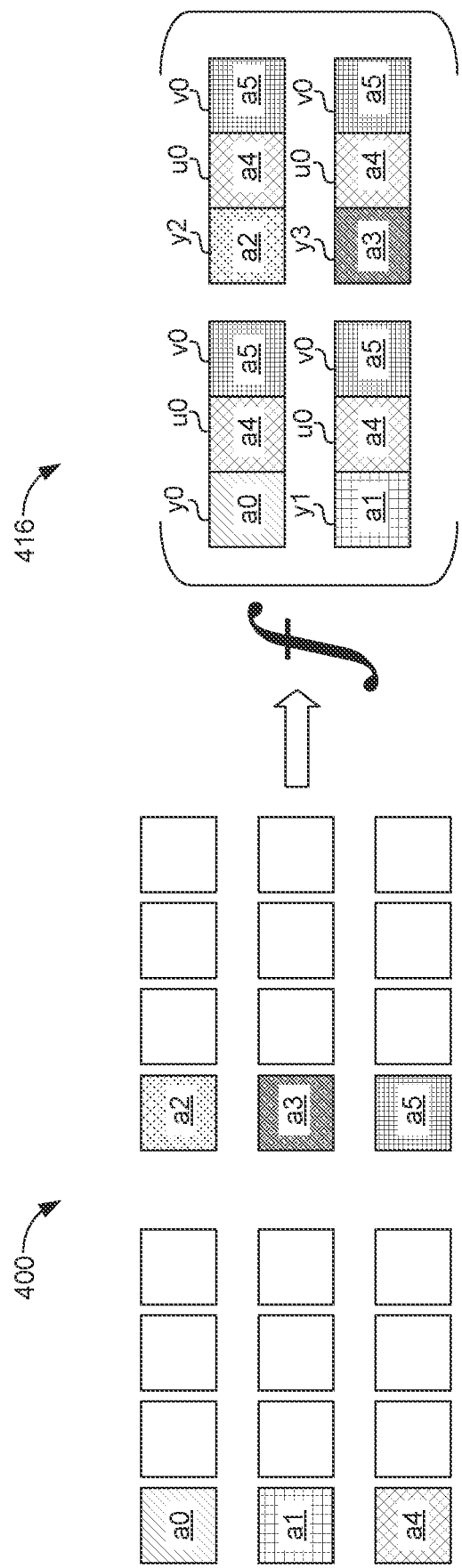
FIG. 4A is an illustration of converting alpha information to a YUV420 video frame format in an RGB color space, in accordance with some embodiments of the present disclosure.

In some examples, groups of alpha samples may be attached to the video stream as a single sample of the color space (e.g., a single pixel color value). In such examples, for some of the color samples of the color space, each value that typically represents a color component of the color sample for a pixel may instead represent an alpha component for a pixel. Thus, alpha samples for multiple pixels may be stored in the space typically used to store a color sample for a single pixel. Any suitable format could be used to store alpha samples in channels of color samples, which may vary for different color spaces. For converting alpha information to a YUV444 video frame format in an RGB color space, the stream encoder 124 may attach triplets of alpha samples as a single RGB sample: a0 to r0; a1 to g0; and a2 to b0, as in an image 404 of FIG. 4B. Referring now to FIG. 4A, FIG. 4A is an illustration of converting alpha information to a YUV420 video frame format in an RGB color space. The stream encoder 124 may account for chroma sub-sampling by treating alpha as YUV and adding a header of 2×3 alpha 400 to 2×2 yuv2rgb(scale(alpha)) blocks 416, where the first 2×2 alpha values {a0, a1, a2, a3} map to 2×2 Y values {y0, y1, y2, y3} and the remaining 1×2 alpha values {a4, a5} are replicated to 2×2 U/V values {u0, v0}, as illustrated in FIG. 4A.

For converting alpha information to a YUV444 video frame format in a YUV color space, the stream encoder 124 may scale alpha to according to a YUV space definition (BT.601/709, full/studio swing), then attach triplets of successive alpha samples as a single YUV sample: a0 to y0; a1 to u0; and a2 to v0. For converting alpha information to a YUV4420 video frame format in the YUV color space, the stream encoder 124 may scale alpha according to the YUV space definition, then attach two triplets of alpha samples as 4Y samples+2UV samples: a0, a1, a2, a3 to y0 y1, y2 y3 (4 Y samples); a4 to u0 (1 UV sample); and a5 to v0 (1 UV sample).

In transcoding the alpha information, the stream encoder 124 may maintain full alpha resolution, and may account for different YUV space definitions (e.g., BT.601/709, full/studio swing), RGB/YUV space overlaps, and/or YUV420 chroma sub-sampling. Further, the total size with attached alpha information for a YUV444 format may be expressed as:

$$\text{total size} = \text{original frame size} * (1 + \tfrac{1}{3}) \quad \text{equation (1)}$$

and for a YUV420 format as:

$$\text{header size} = \text{original frame size} * (1 + \tfrac{2}{3}) \quad \text{equation (2)}$$

where the fraction part of equations (1) and (2) may refer to the cost of adding an image region which carries the alpha information.

In using any color space, the stream encoder 124 may align a frame's width and/or height to given block sizes by replicating frame edge/border values. During decoding by the stream decoder 140, the original frame sizes may still be reconstructed using "block size % frame size." Converting the alpha information to a YUV444 video frame format in the YUV color space or the RGB color space, as described above, may be fast with minimal precision loss due to (BT.601/709, full/studio swing) scaling. Further, converting alpha information to a YUV420 video frame format in an RGB color space may allow streaming of alpha information when the underlying video pipeline does not provide YUV access on either end, or YUV color space operations are impractical for any reason. Thus, using disclosed approaches, the streaming of per-pixel transparency information may be provided despite the limitations of conventional codecs.

Figure 4B:
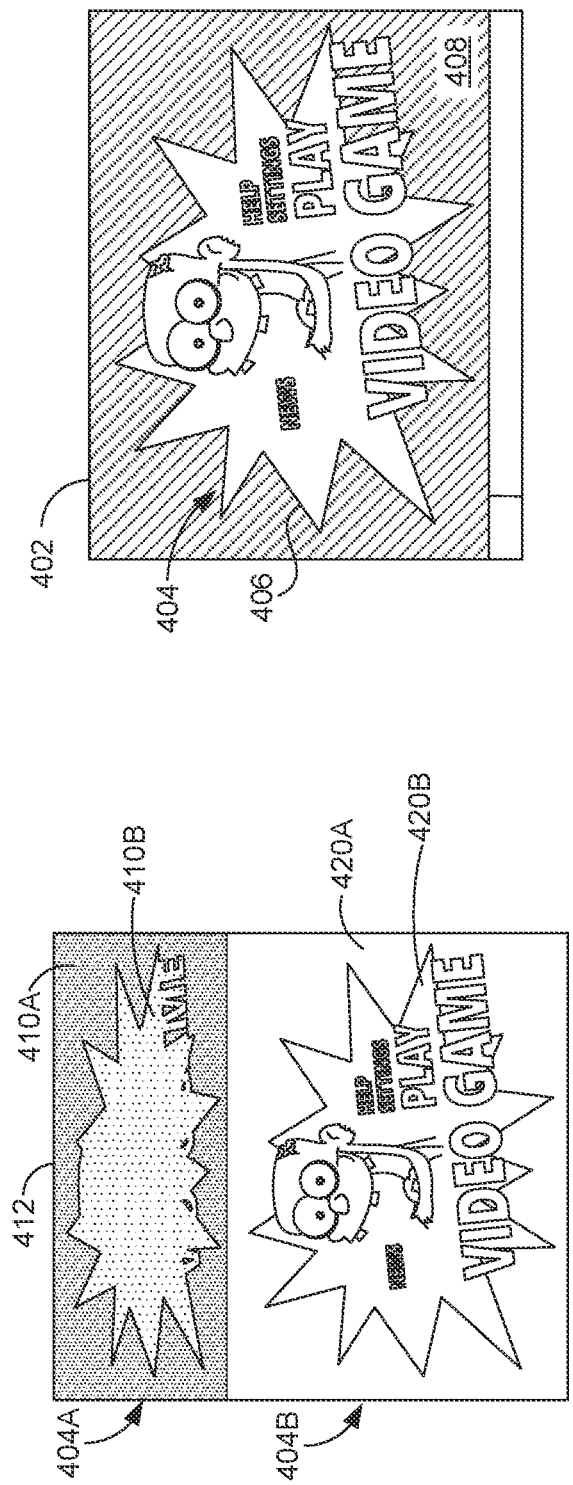
FIG. 4B is an illustration of an example of laying out image regions of an image with per-pixel alpha information and of a display of the image on a desktop, in accordance with some embodiments of the present disclosure.

FIG. 4B is an illustration of an example layout 412 of image regions 404A and 404B of the image 404 with per-pixel alpha information and of a display of the image 404 on a desktop 402, in accordance with some embodiments of the present disclosure. The image 404 is displayed on the desktop 402 over the desktop background 408 using the per-pixel alpha information and represents visual content of the window 406, by way of example. The image 404 may be displayed in a similar manner on a local desktop or a remote desktop. Where the desktop 402 is a local desktop—such as the local desktop 102B—the window 406 may be a proxy window for an application window on the remote desktop.

When encoded in a video format for display on the local desktop, the image 404 may be represented by image data in which alpha samples for pixels are encoded to the color space used to store color samples for other pixels (an RGB color space in YUV444 format in the illustrated example). For example, the layout 412 of the image 404 is shown in FIG. 4B where the image region 404A may comprise alpha samples for pixels in an image region 404B of the image 404. The image 404 may be, for example, a splash screen of an application in which alpha samples 410A indicate completely transparent pixels for color samples 420A and alpha samples 410B indicate complete non-transparent pixels for color samples 420B. In an example where the image 404 uses an RGB color space, a color sample for each pixel in image region 404A may store alpha samples for three pixels in the image region 404B. Thus, the image region 404A may be a third of the size of the image region 404B. The association between an alpha sample and a color sample may be implicit in the pixel location and the used RGB channel of the alpha sample, such that the decoder may use the pixel location and the used RGB channel of an alpha sample to compute the pixel location of the color sample.

Further aspects of the disclosure provide approaches that may be used for the transfer of visuals, such as desktop visuals, using image data of a video stream(s) in which the visuals are split into 2D pages of a virtual frame, with each of the 2D pages being a fraction of a size of a frame of a video stream(s). The stream encoder 124 may use these approaches to encode the desktop visuals of the network stream 134. In disclosed approaches, a virtual frame may be similar to a frame of the video stream(s) that the desktop renderer 136 may otherwise use to render one or more portions of the remote desktop 102A on the local desktop 102B at a given time, except that regions of the virtual frame may be distributed across multiple actual frames of the video(s) stream as opposed to a single frame.

Streaming "paged" desktop visuals may simplify the logic applied to the placement of multiple desktop elements into a single transmitted surface (e.g., the visual surface 332 of FIG. 3B) and their later reconstruction from that surface by the desktop renderer 136. Further, disclosed approaches may avoid the usage of complex bin-packing algorithms. In some examples, disclosed approaches may allow for the encoding, by the stream encoder 124, of one or more portions of a virtual frame, rather than complete window visuals in every frame, which may allow for balancing workload and bandwidth requirements. Further, disclosed approaches may be used to mitigate video frame size limitations of video codecs used to encode the video stream of the network stream 134.

Figure 5:
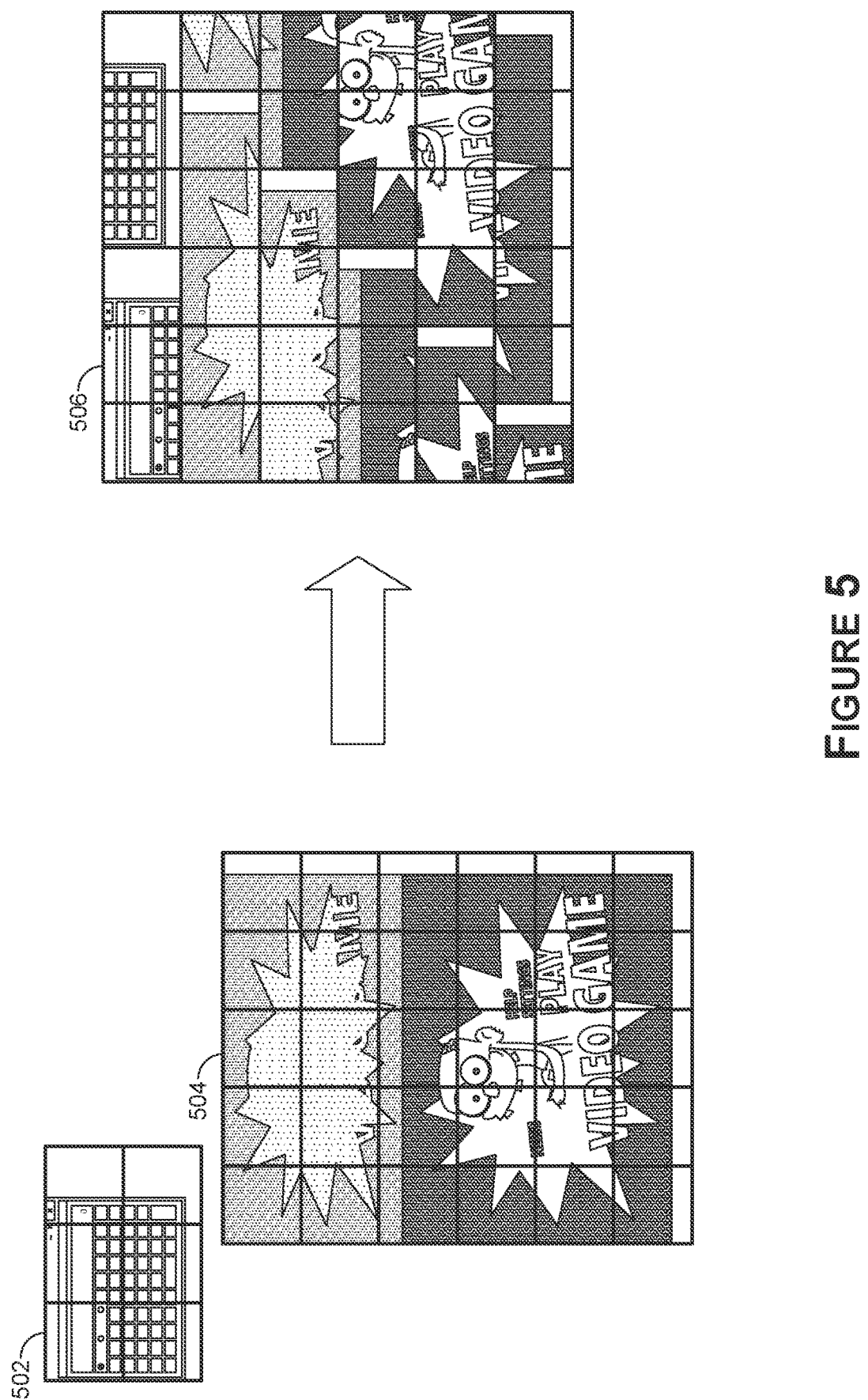
FIG. 5 is an illustration of generating a frame of a virtual frame from window visuals of application windows, in accordance with some embodiments of the present disclosure.

Referring now to FIG. 5, FIG. 5 is an illustration of generating a frame 506 of a virtual frame from window visuals of application windows, in accordance with some embodiments of the present disclosure. An image 504 of FIG. 5 may correspond to window visuals of an application window designated by the streaming determiner 126 to be streamed in the network stream 134. For example, the image 504 may correspond to the image 404 of FIG. 4B. The image 502 of FIG. 5 may correspond to window visuals of another application window designated by the streaming determiner 126 to be streamed in the network stream 134. Any number of sets of desktop visuals for any number of sets of desktop elements, such as those corresponding to the image 502 and the image 504 may be assigned to a virtual frame by the virtual frame generator 128. For example, the sets of desktop visuals may be designated for concurrent display on the local desktop 102B at a given time. Thus, for the visual surface 332 of FIG. 3B, the virtual frame may include window visuals for each of the application windows 312, 314, and 316. The virtual frame generator 128 may obtain the window visuals for a virtual frame from any number of visual surfaces, such as the visual surface 332.

The virtual frame generator 128 may split the desktop visuals for each desktop element of the virtual frame into 2D pages. For example, in FIG. 5, a grid is displayed over the image 504 with each cell corresponding to a 2D page, and visual content of the 2D pages forming the image 504. Similarly, a grid is displayed over the image 502 with each cell corresponding to a 2D page, and visual content of the 2D pages forming the image 502. This may be similar to how an operating system may split virtual memory ranges into one-dimensional pages of physical memory. Each of the 2D pages may be a fixed-size fraction of a video frame and may ideally align with downstream encoder block sizes to avoid artifacts and to improve encoding performance.

A page table for mapping the 2D pages to the virtual frame may be encoded in the desktop metadata (such as window metadata) of the network stream 134 and may be used by the desktop renderer 136 to render appropriate portions of the virtual fame. The mapping of the page table for each virtual frame (e.g., a {window ID, window page} to {stream/container ID, frame/container page}) may be expressed as a function of the other window metadata, including window page container size, and page size. As each video stream may already provide per-frame window metadata (as described herein), and the window page container size may be given by the video frame size, the remote system 116 and the local system 118 may be easily configured to use the same page size to enable the desktop renderer 136 to reconstruct per-frame page tables without having to send them with each frame.

As a specific and non-limiting example, the image 502 may have a resolution of 423×323, the image 504 may have a resolution of 849×1028, the 2D page size may have a resolution of 180×180, and the frames of the videos stream may have a resolution of 1080×1080 (e.g., the 2D page size may be evenly divisible into the frame size for maximum usage). In the above example, the virtual frames may also have a resolution of 1080×1080, or may have a larger resolution, such as 1920×1080, or a smaller resolution (e.g., where a frame supports multiple virtual frames).

The virtual frame generator 128 may treat each video frame as a virtual frame container (e.g., a window page container) that stores visual content of any number of the 2D pages for any number of the desktop elements in a 2D grid arrangement. For example, FIG. 5 depicts a frame 506 in which image data of at least some of the 2D pages that correspond to the image 504 and the image 502 are stored in respective cells of the 2D grid of the frame 506. Other 2D pages of the virtual frame may similarly be stored in respective cells of a 2D grid of other frames of the virtual frame. Any of the 2D grids may be resized at runtime to accommodate page count requirements of the virtual frames, the requirements of the transport channel (e.g., and without limitation, of the stream encoder 124, of network bandwidth, and/or of the stream decoder 140).

These approaches may allow for the alpha information to be encoded into the video stream(s) while the network stream 134 still supporting high resolution desktop streaming, may allow for the network stream 134 to support higher resolution desktop streaming than the video codecs may otherwise allow (e.g., the actual desktop area may exceed limits of involved video codec implementations). Also, these approaches may be used to include in the network stream 134 portions of desktop visuals that are obscured or occluded on the remote desktop 102A (e.g., by overlapping portions of other windows). For example, while in some embodiments the relative locations of one or more of the desktop elements of the remote desktop 102A may be mirrored with the relative locations of proxies for those elements on the local desktop 102B, in other cases they may be located independently. Thus, those portions of the desktop visuals may not be obscured on the local desktop 102B.

These approaches may allow for the desktop renderer 136 to display the portions desktop visuals that are obscured or occluded on the remote desktop 102A (e.g., by overlapping portions of other windows). Additionally, or alternatively, these approaches may allow for buffering of the portions of the desktop visuals on the local desktop 102B for when they become unobscured. Additionally, or alternatively, these approaches may allow for such features as displaying a preview window 204B of FIG. 2B for the proxy window 106B in complete form on the local desktop 102B even where portions of the desktop visuals are obscured, as shown. The preview window 204A of FIG. 2A and the preview window 204B of FIG. 2B, which may also be referred to as thumbnail windows, display a smaller representation of the application window 106A and/or the proxy window 106B. The preview window 204B may, for example, be independent from the preview window 204A of FIG. 2A allowing for preview windows even where the remote desktop 102A does not support preview windows or image data of a preview window is otherwise unavailable. As another example, the preview window 204B may be a proxy window for the preview window 204A.

In various embodiments, the network stream 134 may include multiple parallel video streams to send each virtual frame over the network by distributing the fixed-size fractions (e.g., pages) of each virtual frame over multiple page containers. This approach may allow the system to mitigate video frame size or other limitations of the video codecs used to perform the encoding, where video streams may be saturated sequentially, or in parallel (e.g., to balance workload and bandwidth requirements).

The desktop event monitor 132A of the remote system 116 may be configured to identify events associated with the remote desktop 102A, such as a window creation event or a window destruction event associated with an application and/or application window on the remote desktop 102A. For example, an application may launch the application window 106A. The desktop event monitor 132A may notify the streaming determiner 126, which may include the application window 106A in the network stream 134 based at least in part on a detected window creation event. Conversely, an application window associated with an application may be destroyed (e.g., closed by the user, system, or application). The desktop event monitor 132A may notify the streaming determiner 126, which may exclude the application window 106A from the network stream 134 based at least in part on a detected window destruction event.

As another example, the desktop event monitor 132A may be configured to identify a window mode change event of an application and/or application window on the remote desktop 102A. For example, an application may switch the application window 106A to a full screen mode, in which case the streaming determiner 126 may exclude one or more other desktop elements from the network stream 134 based at least in part on the detected window mode change event. As another example, the application may switch the application window 106A to a windowed screen mode, in which case the streaming determiner 126 may add one or more other desktop elements to the network stream 134 based at least in part on the detected window mode change event. The desktop event monitor 132A may be implemented, at least partially, using a frame provider that uses existing screen monitor logic to track the screen-state (e.g., full screen mode, windowed mode) of a running application, where the logic may automatically switch between windowed and full-screen capture as needed. In some examples, the desktop event monitor 132A may use a window lifecycle event monitor provided by the operating system, for example and without limitation. In other examples, the desktop event monitor 132A may be implemented by polling current window lifecycle states. The streaming determiner 126 may maintain a list of processes of interest. On every window create/destruction event, the window lifecycle event monitor (or other event tracking module of the desktop event monitor 132A) may be used to update the list of active windows and the streaming determiner 126 may generate a list of windows to include or exclude from the network stream 134.

In some examples, the desktop event monitor 132A of the remote system 116 may be configured to identify or detect a window creation event, a window destruction event, a window mode change events, and/or other event associated with an application and/or application window on the remote desktop 102A that is initiated by user input to the local desktop 102B, by an application, and/or operating system running on the local system 118. The desktop event monitor 132A may also be configured to identify or detect mouse or cursor events (e.g., mouse clicks, cursor motion, etc.) initiated by user input to the local desktop 102B. To do so, the desktop event monitor 132A may work in conjunction with the desktop event monitor 132B of the local system 118. For example, the desktop event monitor 132B may detect or identify the events, which may be transmitted to the desktop event monitor 132A in the network stream 134 (e.g., as window properties which may employ delta-encoding). Other examples of events that may be detected by the desktop event monitor 132B include gain/lose focus events, move/resize commands, and minimize/maximize/restore commands.

The desktop event monitor 132B may identify the transmitted event(s) and the desktop event monitor 132A may implement the event(s) at the remote desktop 102A (e.g., by simulating user input to the remote desktop 102A and sending one or more commands to the operating system or application, etc.). As an example, user input to the command button 220 of the proxy window 106B of FIG. 2B may result in the desktop event monitor 132B detecting a window destruction event for the application window 106A of FIG. 2A. The desktop event monitor 132B may provide the event to the communications manager 120B, which may transmit the event to the remote system 116. The desktop event monitor 132A may detect the transmitted event and cause the application window to be closed on the remote system 116. As another example, the desktop event monitor 132A may use mouse click events from the desktop event monitor 132B to generate corresponding events at the remote system 116, such as those associated with applications and/or application windows (e.g., to launch or close application windows, etc.).

In any example, the streaming determiner 126 may update a list of application windows and/or other desktop elements to include in the network stream 134 to be transmitted to the local desktop 102B in response to being notified by the desktop even monitor 132A of the identified events.

At the local system 118, the communications manager 120B, may receive the network stream 134. The network stream 134 may include data representative of desktop visuals and corresponding desktop properties for any number of desktop elements (e.g., in the form of desktop metadata). The data representative of desktop visuals and corresponding desktop properties may then be decoded by the stream decoder 140. The data representative of desktop visuals may include alpha information, such as at least some of the alpha samples 510A of FIG. 5 (e.g., from the frame 506 or from the visual surface 332 of FIG. 3B or other visual surface). Where alpha samples are included in the network stream 134, the desktop renderer 136 may correlate the alpha samples with the color samples in order to render pixels with appropriate transparency.

The desktop renderer 136 may render, on the local desktop 102B, proxy desktop elements of the desktop elements of the remote desktop 102A to the local desktop 102B using at least some of the decoded desktop visuals and their corresponding decoded desktop properties. For example, at least some of the window visuals for the application window 106A may be rendered in the proxy window 106B, as in FIG. 2B, based at least in part on the window properties (e.g., the location, size, etc.). In some examples, the application window 106A may be on the remote desktop 102A at one coordinate location but is rendered on the local desktop 102B at a different coordinate location. For example, the proxy window 106B may be located differently from the application window 106A. Additionally, or alternatively, the local desktop 102B may use a different coordinate system than then remote desktop 102A. In these cases, the location from the window properties may be translated by the desktop renderer 136 to the coordinate system of the local desktop 102B, or the translation may be performed by the desktop capturer 130 prior to inclusion in the network stream 134. In some examples, the desktop renderer 136 may apply coordinates of desktop elements that are associated with video frames (e.g., in the desktop metadata) to decoded video frames, in order to crop all desktop elements from the frames and then reconstruct the remote desktop 102A layout or topology including the application window layout to replicate the layout from the remote system 116.

Figure 2B:
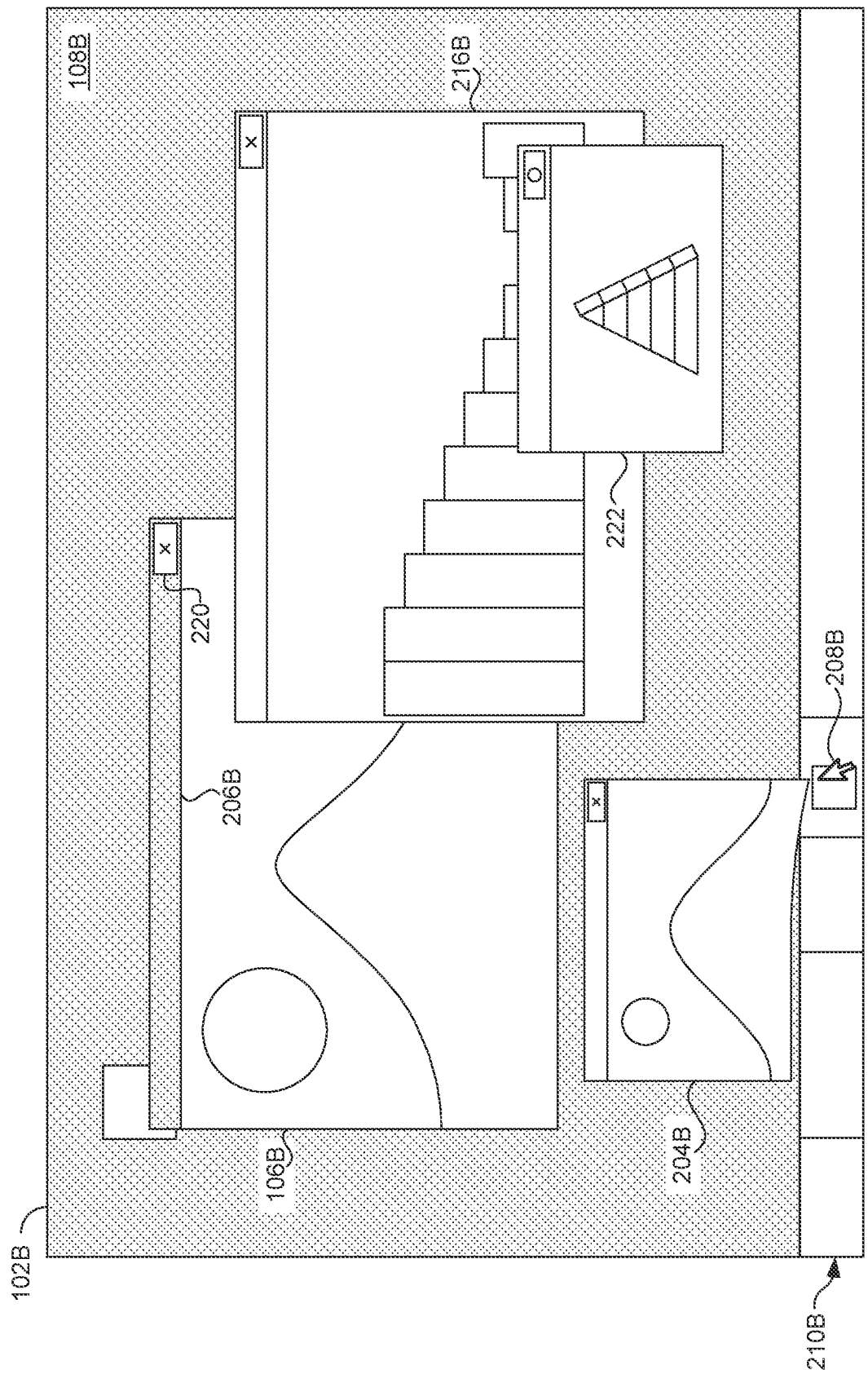
FIG. 2B is an example of a local desktop, in accordance with some embodiments of the present disclosure

As a further example of rendering proxy desktop elements, at least some of the window visuals for the application window 216A of FIG. 2A may be rendered in a proxy window 216B of FIG. 2B. When rendering the proxy desktop elements, the desktop renderer 136 may preserve the relative Z-order of the corresponding application windows on the remote desktop 102A. For example, the proxy window 216B may be displayed over the proxy window 106B on the local desktop 102B in FIG. 2B because the application window 216A is displayed over the application window 106A on the remote desktop 102A in FIG. 2A. The relative Z-order of application windows and/or other desktop elements that is used by the desktop renderer 136 may be captured by window properties that may be included in the window metadata, for example.

Rendered proxy desktop elements may be present on the local desktop 102B along with native desktop elements and may be seamlessly integrated into the local desktop 102B, such that they may behave like native desktop elements. For example, as in FIG. 2B, the local desktop 102B may include the proxy window 106B as well as a native application window 222 which is native to the local device. Moreover, the proxy window 106B and the native application window 114 may include one or more different system areas or frame areas when the local desktop 102B is on a different operating system than the remote desktop 102A (e.g., a Windows formatted proxy window may be present on a Linux operating system with other Linux formatted application windows). As another example, the desktop renderer 136 may render one or more system areas or frame areas of one or more proxy desktop elements using native desktop visuals. A user may interact with both the proxy window 106B and the native application window 114 on the local desktop 102B as though both are native to the local desktop 102B. For example, the desktop renderer 136 may track the Z-order of proxy windows and/or other proxy desktop elements relative to native application windows and/or desktop elements and display the desktop visuals accordingly (e.g., accounting for overlaps, changes in Z-order, etc.). Other native elements may be provided such as a taskbar 210B, or the taskbar 210B may be a proxy desktop element for the taskbar 210A.

The local desktop 102B may include a cursor 208B that is native to the local system 118 or may mimic the cursor 208A of the local system 118. Many applications define their own specific mouse cursors. For example, while a unidirectional arrow is a standard cursor during normal operation for standard productivity applications such as web-browsing and word processing software, the cursor 208A may be represented by different graphical shapes in different applications or under different operating circumstances. As an example, when zoom functionality is active, the cursor 208A may have the shape of a magnifying glass. Similarly, the cursor 208A may have the shape of an hourglass during periods of longer than normal loading or heavy processing. Gaming applications may also use different shapes to represent the cursor 208A (e.g., an icon of a sword or a reticule). Conventional remote desktop streaming approaches may not be able to mimic the appropriate cursor shape effectively.

In some embodiments, the cursor 208A may be used as a desktop element allowing for display of even non-standard graphical shapes as cursors on the local desktop 102B. The desktop capturer 130 may capture the handle (or other identifier) of the current cursor 208A on the remote system 116 (e.g., as defined by the corresponding application). The handle may then be referenced in a dataset of known cursors at the remote system 116 to determine a corresponding identifier that is sent to the local system 118. The desktop renderer 136 of the local system 118 may reference the identifier in its own dataset of known cursors and set the local cursor 208B to the appropriate known cursor. When the application cursor is not found in the set of known cursors at the remote system 116, the new cursor may be captured by the desktop capturer 130 (e.g., as a bitmap), cached both at the remote system 116 and the local system 118, and then appended to the set of known cursors for future reference/usage. The remote system 116 may intelligently transmit only captured bitmaps of new cursors; as the old/known ones may already be saved into a cache at the local system 118.

Figure 6:
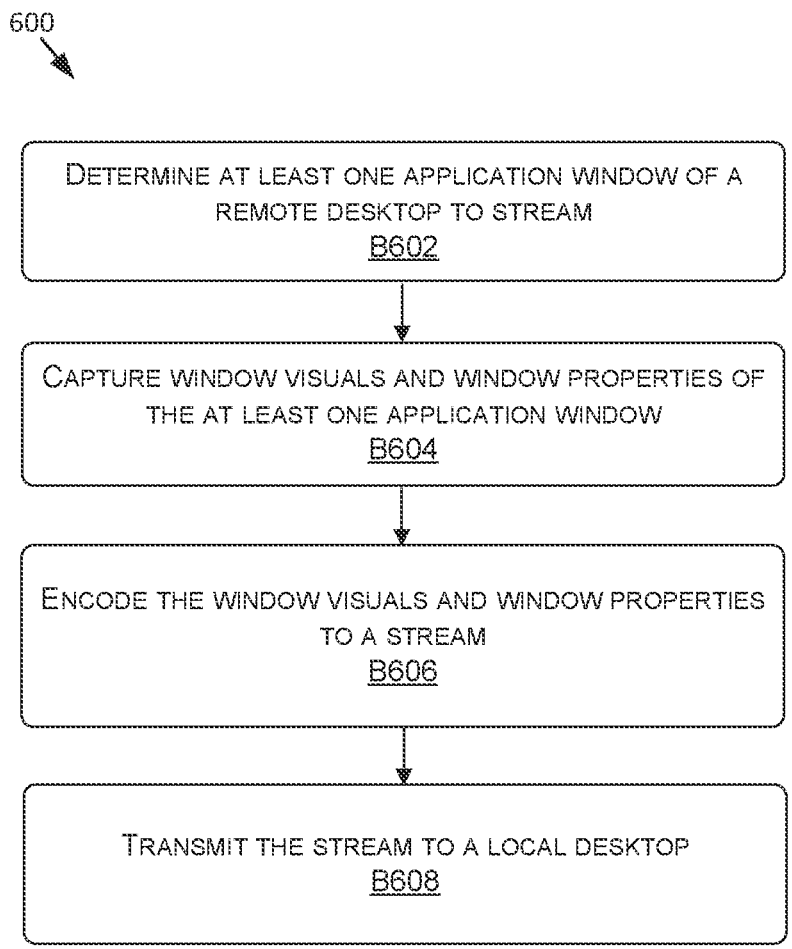
FIG. 6 is a flow diagram showing a method for remote desktop streaming, in accordance with some embodiments of the present disclosure.

Referring now to FIG. 6, FIG. 6 is a flow diagram showing a method 600 for remote desktop streaming, in accordance with some embodiments of the present disclosure. At block B602, the method 600 includes determining at least one application window of a remote desktop to stream. For example, the streaming determiner 126 of the remote system 116 may determine at least one application window of the remote desktop 102A to include in the network stream 134 to the local desktop 102B of a local device, such as the application window 106A.

At block B604, the method 600 includes capturing window visuals and window properties of the at least one application window. For example, the desktop capturer 130 of the remote system 116 may capture window visuals and corresponding window properties of the at least one application window.

At block B606, the method 600 includes encoding the window visuals and window properties to a stream. For example, the stream encoder 124 of the remote system 116 may encode the window visuals and the window properties of at least one application window to at least one video stream of the network stream 134.

At block B608, the method 600 includes transmitting at least some of the stream to a local desktop. For example, the communications manager 120A of the remote system 116 may transmit the network stream 134 comprising the at least one video stream and window metadata representative of the window properties of the at least one application window to the local desktop 102B.

Figure 7:
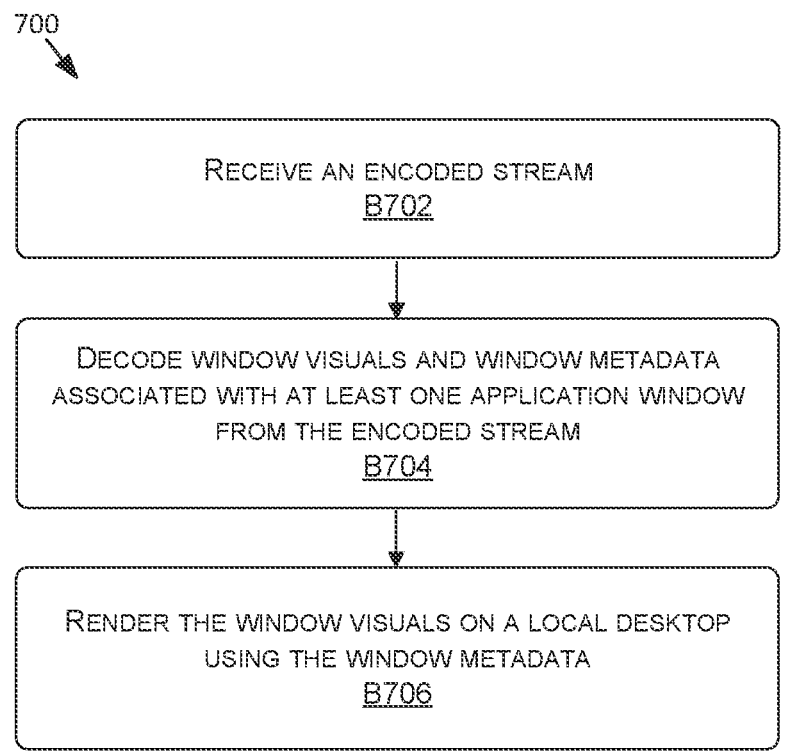
FIG. 7 is a flow diagram showing a method rendering desktop visuals of a remote desktop on a local desktop, in accordance with some embodiments of the present disclosure.

Referring now to FIG. 7, FIG. 7 is a flow diagram showing a method 700 for rendering desktop visuals of a remote desktop on a local desktop, in accordance with some embodiments of the present disclosure.

At block B702, the method 700 includes receiving an encoded stream. For example, the communications manager 120B of the local system 118 may receive the network stream 134 of one or more application windows of the remote desktop 102A to the local desktop 102B of a local device, such as the application window 106A. The network stream 134 may include window metadata representative of window properties of the one or more application windows and window visuals of the one or more application windows encoded in at least one video stream of the network stream 134.

At block B704, the method 700 includes decoding window visuals and window metadata associated with at least one application window from the stream. For example, the stream decoder 140 of the local system 118 may decode the window visuals and the window metadata from the network stream 134.

At block B706, the method 700 includes rendering the window visuals on a local desktop using the window metadata to construct proxy window(s). For example, the desktop renderer 136 of the local system 118 may render—on the local desktop 102B—the decoded window visuals that correspond to an application window of the one or more application windows in a proxy window of the application window (e.g., the proxy window 106B of the application window 106A) based at least in part on the decoded window properties of the application window.

Figure 8:
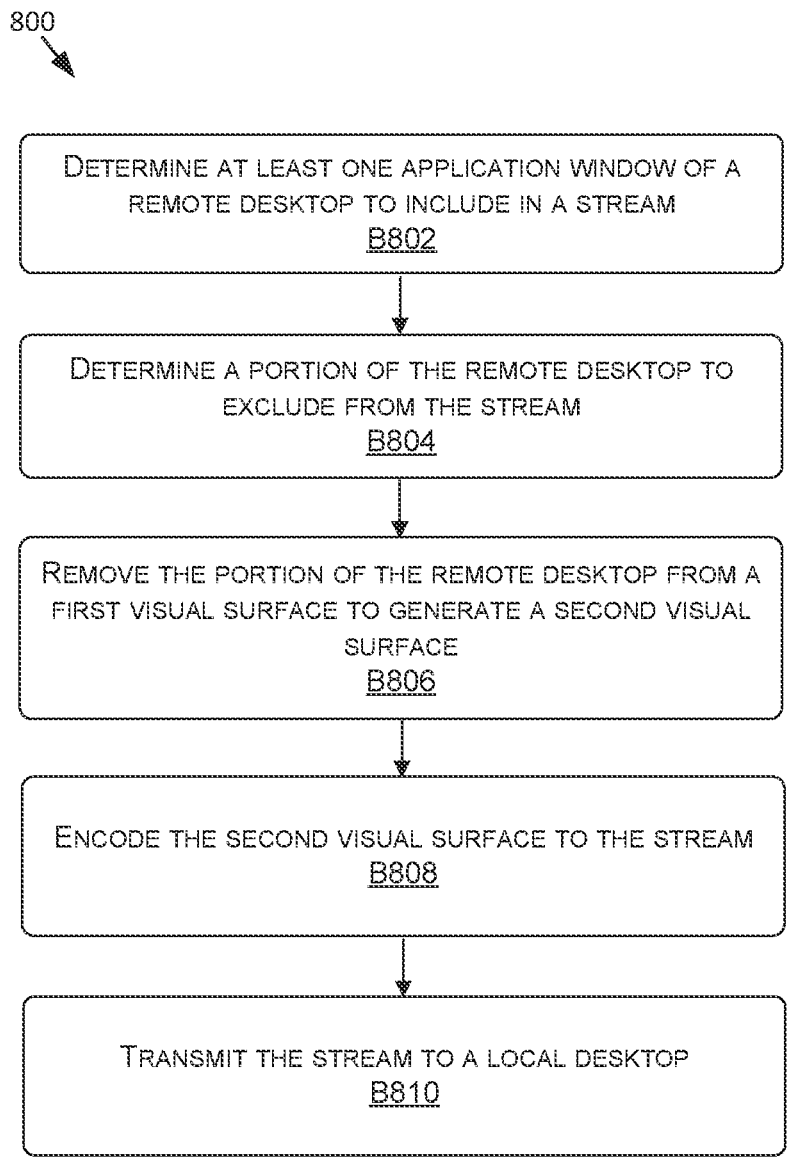
FIG. 8 is a flow diagram showing a method for selectively transmitting portions of a remote desktop to a local desktop, in accordance with some embodiments of the present disclosure.

Referring now to FIG. 8, FIG. 8 is a flow diagram showing a method 800 for selectively transmitting portions of a remote desktop to a local desktop, in accordance with some embodiments of the present disclosure. At block B802, the method 800 includes determining at least one application window of a remote desktop to include in a stream. For example, the streaming determiner 126 of the remote system 116 may determine at least one application window of the remote desktop 102A to include in the network stream 134 to the local desktop 102B of a local device, such as the application window 106A.

At block B804, the method 800 includes determining a portion of the remote desktop to exclude from the stream. For example, the desktop capturer 130 may use the streaming determiner 126 of the remote system 116 to determine at least the desktop region 310 (FIG. 3A) of the remote desktop 102A to exclude from the network stream 134.

At block B806, the method 800 includes removing the portion of the remote desktop from a first (e.g., a captured) visual surface to generate a second (e.g., to be transmitted) visual surface. For example, the desktop capturer 130 may remove the desktop region 310 of the remote desktop 102A from the remote desktop surface 304 to generate the visual surface 334 having the region 330 in place of the desktop region 310. This may or may not involve a stencil and may or may not involve reducing the entropy of the desktop region 310 to generate the region 330. Further, while the remote desktop surface 304 is used as an example, the portion(s) of the remote desktop 102A may be removed from other visual surfaces that may be used to encode desktop visuals to the network stream 134.

At block B808, the method 800 includes encoding the second visual surface to the stream. For example, the stream encoder 124 of the remote system 116 may encode, to the network stream 134, the visual surface 334 that comprises window visuals of at least one application window without the desktop region 310 of the remote desktop 102A.

At block B810, the method 800 includes transmitting the stream to a local desktop. For example, the communications manager 120A of the remote system 116 may transmit the network stream 134 to the local desktop 102B.

Figure 9:
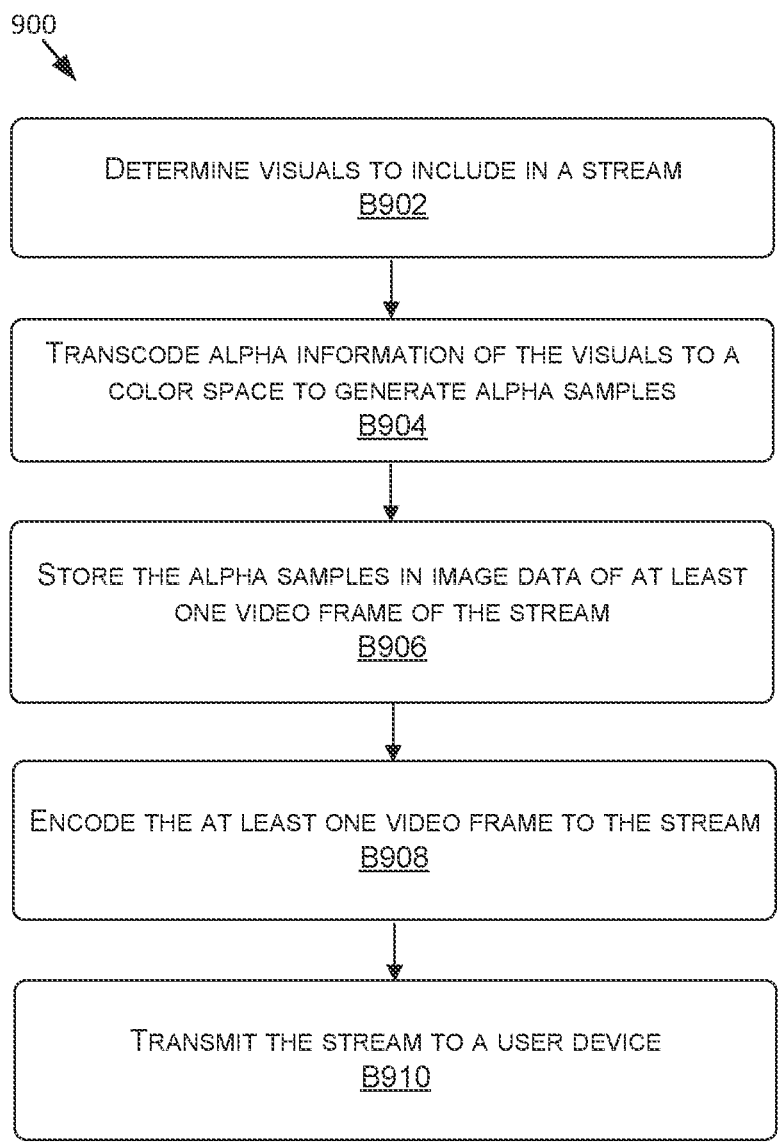
FIG. 9 is a flow diagram showing a method for transmitting alpha information of visuals in one or more frames of a video stream, in accordance with some embodiments of the present disclosure.

FIG. 9 is a flow diagram showing a method 900 for transmitting alpha information of visuals in one or more frames of a video stream, in accordance with some embodiments of the present disclosure. The method 900, at block B902 includes determining visuals to include in a stream. For example, the streaming determiner 126 of the remote system 116 may determine to include window visuals of the application window corresponding to the image 504 of FIG. 5 in the network stream 134.

The method 900, at block B904 includes transcoding alpha information of the visuals to the color space of the video stream, to generate the "alpha" samples. For example, the stream encoder 124 of the remote system 116 may transcode alpha information of the visuals to an RGB or YUV color space to generate the alpha samples 510A of FIG. 5.

The method 900, at block B906 includes storing the alpha samples in image data of at least one video frame of the stream. For example, the stream encoder 124 of the remote system 116 may store the alpha samples in image data of the frame 506.

The method 900, at block B908 includes encoding the at least one video frame to the stream. This video frame may include transcoded alpha information. For example, the stream encoder 124 of the remote system 116 may encode the frame 506 to the network stream 134.

The method 900, at block B910 includes transmitting the stream to a user device. For example, the communications manager 120A of the remote system 116 may transmit the network stream 134 to a local device that hosts the local desktop 102B. While examples described are applicable to remote desktop streaming, the method 900 may more generally be used to stream and display visuals for any suitable applications.

Figure 10:
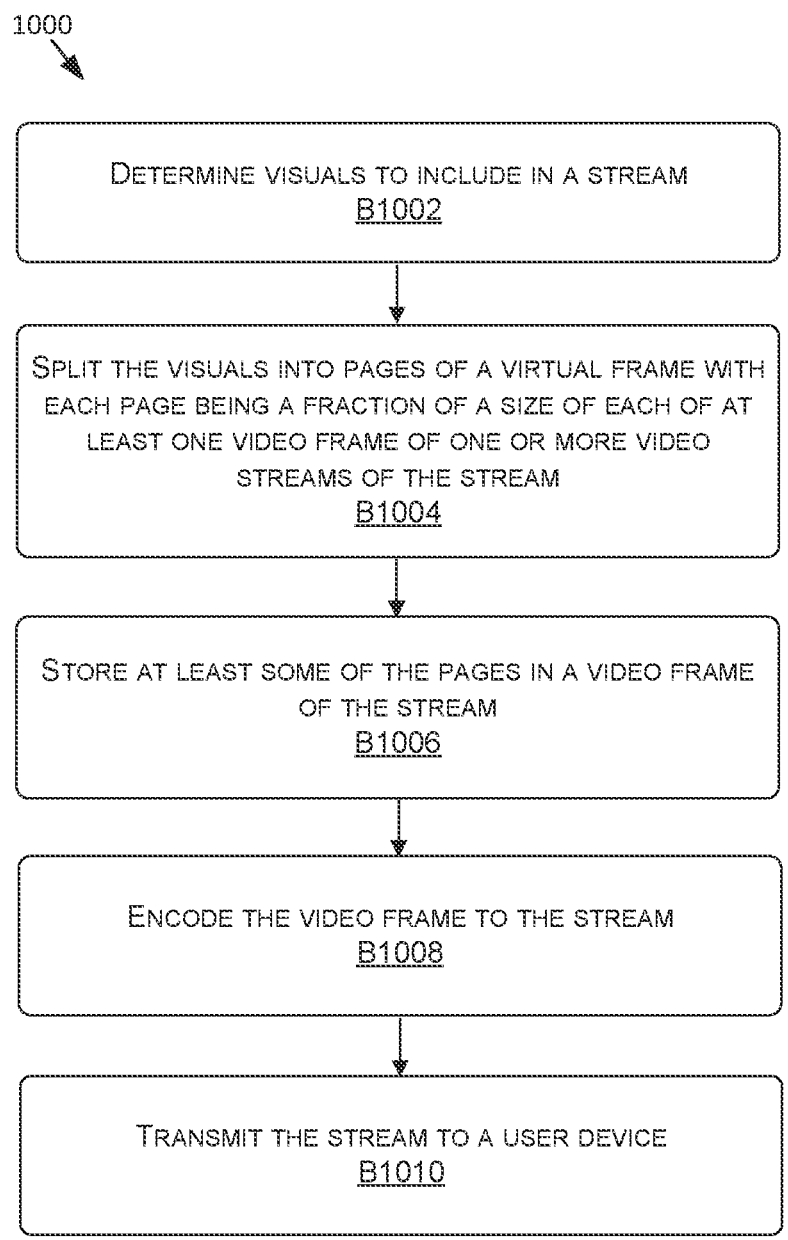
FIG. 10 is a flow diagram showing a method for streaming a virtual frame over a video stream, in accordance with some embodiments of the present disclosure.

FIG. 10 is a flow diagram showing a method 1000 for streaming a virtual frame over a video stream, in accordance with some embodiments of the present disclosure. The method 1000, at block B1002 includes determining visuals to include in a stream. For example, the streaming determiner 126 of the remote system 116 may determine to include window visuals of the application windows corresponding to the image 502 and the image 504 of FIG. 5 in the network stream 134.

The method 1000, at block B1004 includes splitting the visuals into pages of a virtual frame with each page being a fraction of a size of each of at least one video frame of one or more video streams of the stream. For example, the stream encoder 124 of the remote system 116 may split the visuals corresponding to the image 502 and the image 504 into pages of a virtual frame, as indicated in FIG. 5. Each page may be a fraction of a size of the frame 506 of a video stream of the network stream 134. Each page may be sized optimally for the currently active video encoder.

The method 1000, at block B1006 includes storing at least some of the pages in a video frame of the stream. For example, the stream encoder 124 of the remote system 116 may store the pages in the frame 506 of the network stream 134. In various examples, a subset of the pages may be stored in one video frame and others of the pages may be stored in other video frames of the network stream 134. Further, the stream encoder 124 may store the pages in the video frame in accordance with the page table. The network stream 134 may include metadata (e.g., stream/container ID, frame/container page ID, etc.) that the local system 118 may use to determine where each page of the received virtual frame maps into proxy windows, in accordance with the page table.

The method 1000, at block B1008 includes encoding the video frame to the stream. For example, the stream encoder 124 of the remote system 116 may encode the frame 506 to the network stream 134.

The method 1000, at block B1010 includes transmitting the stream to a user device. For example, the communications manager 120A of the remote system 116 may transmit the network stream 134 to a local device that hosts the local desktop 102B. While examples described are applicable to remote desktop streaming, the method 1000 may more generally be used to stream and display visuals for any suitable applications.

The desktop streaming system 100 may be implemented in an example operating environment 1100 of FIG. 11, in accordance with some embodiments of the present disclosure. Among other components not illustrated, the operating environment 1100 may include a server device(s) 1102, a network(s) 1104, a user device(s) 1106, and a data store(s) 1108. It should be understood that operating environment 1100 shown in FIG. 11 is an example of one suitable operating environment. Each of the components shown in FIG. 11 may be implemented via any type of computing device, such as one or more of computing device 1200 described in connection with FIG. 12, for example. These components may communicate with each other via the network 1104, which may be of any type. The network 1104 may include multiple networks, or a network of networks, but is illustrated in simple form so as not to obscure aspects of the present disclosure. The network 1104 may include any number of different network topologies.

It should be understood that any number of the user device(s) 1106, the server devices 1102, and the data stores 1108 may be employed within the operating environment 1100 within the scope of the present disclosure. Each may be configured as a single device or multiple devices cooperating in a distributed environment.

Figure 12:
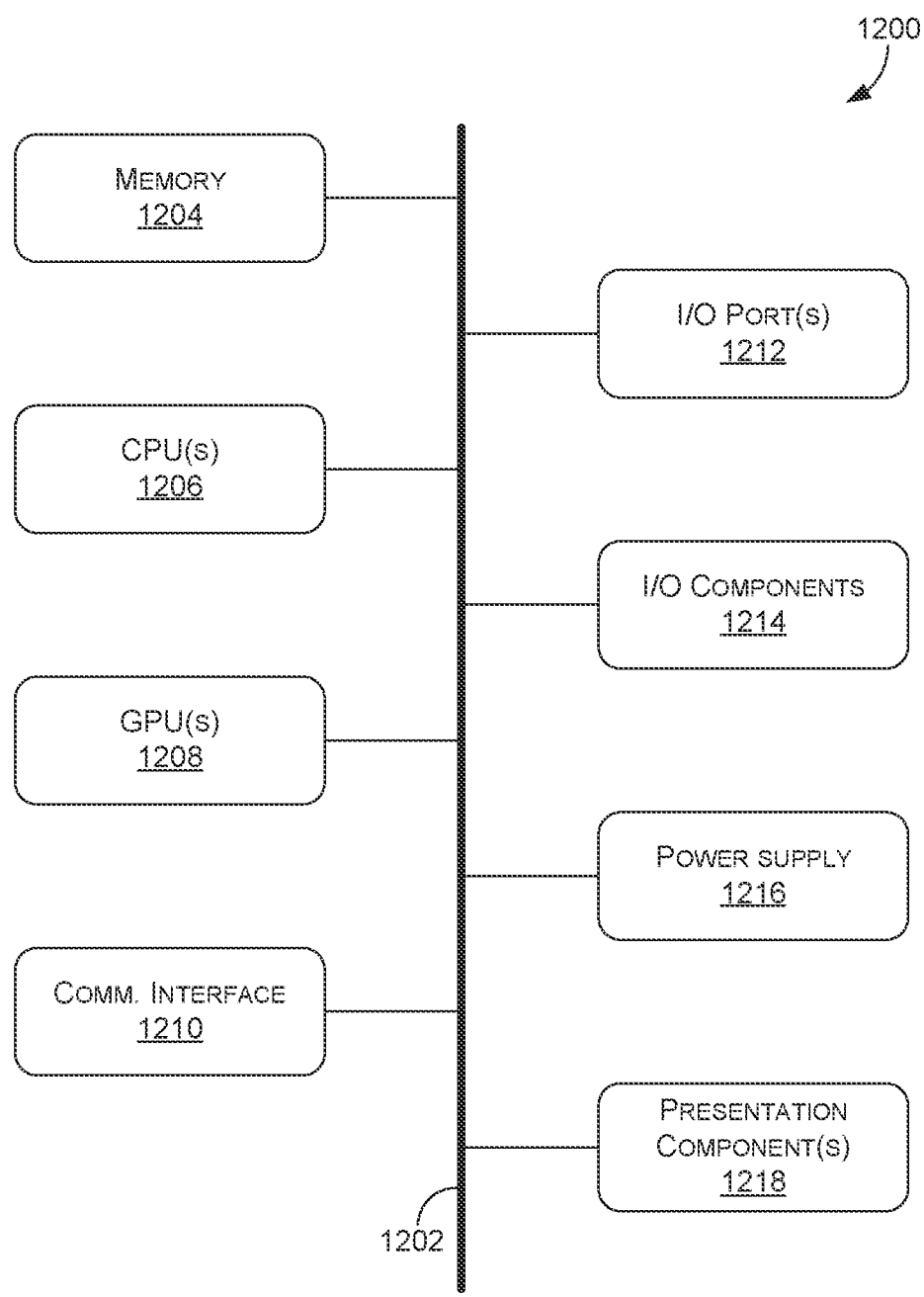
FIG. 12 is a block diagram of an example computing device suitable for use in implementing some embodiments of the present disclosure.

The user device(s) 1106 may include at least some of the components, features, and functionality of the example computing device 1200 described herein with respect to FIG. 12. By way of example and not limitation, a user device 1106 may be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user device(s) 1106 may include one or more processors, and one or more computer-readable media. The computer-readable media may include computer-readable instructions executable by the one or more processors. The instructions may, when executed by the one or more processors, cause the one or more processors to perform any combination and/or portion of the methods described herein and/or implement any portion of the functionality of the desktop streaming system 100 of FIG. 1.

The server device(s) 1102 may also include one or more processors, and one or more computer-readable media. The computer-readable media includes computer-readable instructions executable by the one or more processors. The instructions may, when executed by the one or more processors, cause the one or more processors to perform any combination and/or portion of the methods described herein and/or implement any portion of the functionality of the desktop streaming system 100 of FIG. 1.

The data store(s) 1108 may comprise one or more computer-readable media. The computer-readable media may include computer-readable instructions executable by the one or more processors. The instructions may, when executed by the one or more processors, cause the one or more processors to perform any combination and/or portion of the methods described herein and/or implement any portion of the functionality of the desktop streaming system 100 of FIG. 1. The data store(s) 1108 (or computer data storage) is depicted as a single component, but may be embodied as one or more data stores (e.g., databases) and may be at least partially in the cloud.

Although depicted external to the server device(s) 1102 and the user device(s) 1106, the data store(s) 1108 may be at least partially embodied on any combination of the server device(s) 1102 and/or the user device(s) 1106 (e.g., as memory 1204 (FIG. 12)). For example, some information may be stored on a user device(s) 1106, and other and/or duplicate information may be stored externally (e.g., on a server device(s) 1102). Thus, it should be appreciated that information in the data store(s) 1108 may be distributed in any suitable manner across one or more data stores for storage (which may be hosted externally). For example, the data store(s) 1108 may comprise at least some of the one or more computer-readable media of the server device(s) 1102 and/or at least some of the one or more computer-readable media of the user device(s) 1106.

Referring now to FIG. 12, FIG. 12 is a block diagram of an example computing device 1200 suitable for use in implementing some embodiments of the present disclosure. Computing device 1200 may include a bus 1202 that directly or indirectly couples the following devices: memory 1204, one or more central processing units (CPUs) 1206, one or more graphics processing units (GPUs) 1208, a communication interface 1210, input/output (I/O) ports 1212, input/output components 1214, a power supply 1216, and one or more presentation components 1218 (e.g., display(s)).

Although the various blocks of FIG. 12 are shown as connected via the bus 1202 with lines, this is not intended to be limiting and is for clarity only. For example, in some embodiments, a presentation component 1218, such as a display device, may be considered an I/O component 1214 (e.g., if the display is a touch screen). As another example, the CPUs 1206 and/or GPUs 1208 may include memory (e.g., the memory 1204 may be representative of a storage device in addition to the memory of the GPUs 1208, the CPUs 1206, and/or other components). In other words, the computing device of FIG. 12 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 12.

The bus 1202 may represent one or more busses, such as an address bus, a data bus, a control bus, or a combination thereof. The bus 1202 may include one or more bus types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus.

The memory 1204 may include any of a variety of computer-readable media. The computer-readable media may be any available media that may be accessed by the computing device 1200. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1204 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1200. As used herein, computer storage media does not comprise signals per se.

The communication media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the communication media may include wired media such as a wired network or direct-wired connection, and wireless media such as acoustic, RF, infrared and other wireless media. Combinations of any of the above should also be included within the scope of computer-readable media.

The CPU(s) 1206 may be configured to execute the computer-readable instructions to control one or more components of the computing device 1200 to perform one or more of the methods and/or processes described herein. The CPU(s) 1206 may each include one or more cores (e.g., one, two, four, eight, twenty-eight, seventy-two, etc.) that are capable of handling a multitude of software threads simultaneously. The CPU(s) 1206 may include any type of processor, and may include different types of processors depending on the type of computing device 1200 implemented (e.g., processors with fewer cores for mobile devices and processors with more cores for servers). For example, depending on the type of computing device 1200, the processor may be an ARM processor implemented using Reduced Instruction Set Computing (RISC) or an x86 processor implemented using Complex Instruction Set Computing (CISC). The computing device 1200 may include one or more CPUs 1206 in addition to one or more microprocessors or supplementary co-processors, such as math co-processors.

The GPU(s) 1208 may be used by the computing device 1200 to render graphics (e.g., 3D graphics). The GPU(s) 1208 may include hundreds or thousands of cores that are capable of handling hundreds or thousands of software threads simultaneously. The GPU(s) 1208 may generate pixel data for output images in response to rendering commands (e.g., rendering commands from the CPU(s) 1206 received via a host interface). The GPU(s) 1208 may include graphics memory, such as display memory, for storing pixel data. The display memory may be included as part of the memory 1204. The GPU(s) 1208 may include two or more GPUs operating in parallel (e.g., via a link). When combined together, each GPU 1208 may generate pixel data for different portions of an output image or for different output images (e.g., a first GPU for a first image and a second GPU for a second image). Each GPU may include its own memory, or may share memory with other GPUs.

In examples where the computing device 1200 does not include the GPU(s) 1208, the CPU(s) 1206 may be used to render graphics.

The communication interface 1210 may include one or more receivers, transmitters, and/or transceivers that enable the computing device 1200 to communicate with other computing devices via an electronic communication network, included wired and/or wireless communications. The communication interface 1210 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet), low-power wide-area networks (e.g., LoRaWAN, SigFox, etc.), and/or the Internet.

The I/O ports 1212 may enable the computing device 1200 to be logically coupled to other devices including the I/O components 1214, the presentation component(s) 1218, and/or other components, some of which may be built in to (e.g., integrated in) the computing device 1200. Illustrative I/O components 1214 include a microphone, mouse, keyboard, joystick, game pad, game controller, satellite dish, scanner, printer, wireless device, etc. The I/O components 1214 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1200. The computing device 1200 may be include depth cameras, such as stereoscopic camera systems, infrared camera systems, RGB camera systems, touchscreen technology, and combinations of these, for gesture detection and recognition. Additionally, the computing device 1200 may include accelerometers or gyroscopes (e.g., as part of an inertia measurement unit (IMU)) that enable detection of motion. In some examples, the output of the accelerometers or gyroscopes may be used by the computing device 1200 to render immersive augmented reality or virtual reality.

The power supply 1216 may include a hard-wired power supply, a battery power supply, or a combination thereof. The power supply 1216 may provide power to the computing device 1200 to enable the components of the computing device 1200 to operate.

The presentation component(s) 1218 may include a display (e.g., a monitor, a touch screen, a television screen, a heads-up-display (HUD), other display types, or a combination thereof), speakers, and/or other presentation components. The presentation component(s) 1218 may receive data from other components (e.g., the GPU(s) 1208, the CPU(s) 1206, etc.), and output the data (e.g., as an image, video, sound, etc.).

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
   determining one or more elements of a remote desktop to at least partially exclude from a display of the remote desktop on a local desktop;
   identifying one or more regions of the remote desktop corresponding to the one or more elements to exclude from the display of the remote desktop on the local desktop;
   based at least on the identifying, modifying one or more portions of an image corresponding to a render of the remote desktop to remove the one or more regions of the remote desktop from at least a portion of the render and generate a video frame of a video stream of the remote desktop to the local desktop, the video frame including a modified image of the at least a portion of the render that excludes the one or more regions of the remote desktop;
   based at least on the modifying, generating at least one encoded frame comprising an encoded representation of the video frame that includes the modified image; and
   transmitting a portion of the video stream comprising the at least one encoded frame corresponding to the video frame.

2. The method of claim 1, wherein the one or more regions correspond to a desktop background of the remote desktop and the one or more elements include at least a portion of a desktop of the remote desktop.

3. The method of claim 1, wherein the transmitting of the portion of the video stream is in one or more network communications and causes the display of the remote desktop on the local desktop.

4. The method of claim 1, wherein the image includes a screenshot of the remote desktop, and the modified image includes the screenshot without the one or more elements of the remote desktop.

5. The method of claim 1, wherein the modifying the one or more portions includes replacing the one or more portions with corresponding one or more regions of another image.

6. The method of claim 1, wherein the determining, the modifying, and the identifying, are performed using a host device, and the display of the remote desktop is on a client device.

7. The method of claim 1, the method further comprising transmitting, with the video stream, metadata representative of one or more window properties of an application window in association with the at least one encoded frame.

8. The method of claim 7, wherein the one or more window properties include at least one of a caption, a style, or two or more coordinates corresponding to a position of an application window.

9. The method of claim 1, further comprising generating a virtual stencil that identifies, in the image, one or more first pixel locations of the one or more regions to exclude from the video frame and one or more second pixel locations of at least one element to include in the video frame, wherein the modifying includes applying the virtual stencil to the image.

10. The method of claim 1, further comprising transmitting, in association with the video stream, one or more indications of the one or more elements excluded from the display of the remote desktop.

11. The method of claim 1, wherein the modifying includes replacing pixels depicting the one or more elements with different content based at least on determining to at least partially exclude the one or more elements from the video stream.

12. The method of claim 1, wherein the modifying of the one or more portions of the image includes overwriting pixels depicting the one or more elements with lower entropy data, and the determining the one or more elements to at least partially exclude comprises determining to at least partially exclude the one or more elements that correspond to the lower entropy data.

13. A system comprising:
one or more processing units to execute operations comprising:
selecting one or more elements of a remote desktop to at least partially include in a display of the remote desktop on a local desktop;
identifying one or more regions of the remote desktop to exclude from the display of the remote desktop on the local desktop based at least on the one or more regions falling outside of at least one region corresponding to the one or more elements selected to at least partially include in the display of the remote desktop on the local desktop;
based at least on the identifying, modifying one or more portions of an image corresponding to a render of the remote desktop to remove the one or more regions of the remote desktop from at least a portion of the render and generate a video frame of a video stream of the remote desktop to the local desktop, the video frame including a modified image of the at least a portion of the render that excludes the one or more regions of the remote desktop;
based at least on the modifying, generating at least one encoded frame comprising an encoded representation of the video frame that includes the modified image; and
transmitting a portion of the video stream comprising the at least one encoded frame corresponding to the video stream.

14. The system of claim 13, wherein the one or more elements include one or more of an icon, a taskbar, a command button, a system tray, a start button, a start menu, a shortcut, a cursor, or a window preview.

15. The system of claim 13, wherein the modifying includes replacing pixels depicting the one or more elements with lower entropy data based at least on the selecting the one or more elements.

16. The system of claim 13, wherein the selecting of the one or more elements comprises determining at least one user interface element of the remote desktop to include in the remote desktop as displayed on the local desktop based at least on at least one user interface element identifier of the at least one user interface element, the at least one user interface element identifier used to render the remote desktop on a host device.

17. A processor comprising:
one or more circuits to:
modify one or more portions of an image corresponding to a render of a remote desktop to remove one or more regions of the remote desktop from at least a portion of the render and generate a video frame of a video stream,
the video frame including a modified image of the at least a portion of the render that excludes the one or more regions of the remote desktop,
the one or more regions of the remote desktop being identified to exclude from a display of the remote desktop on a local desktop based at least on locations of one or more elements of the remote desktop that are selected to at least partially exclude or include in the display of remote desktop on the local desktop,
based at least on the modifying, generate at least one encoded frame comprising an encoded representation of the video frame that includes the modified image, and
transmit a portion of the video stream of the remote desktop comprising the at least one encoded frame corresponding to the video frame.

18. The processor of claim 17, wherein the one or more elements include one or more of a desktop of the remote desktop or an application window of the remote desktop.

19. The processor of claim 17, wherein the one or more regions are identified based at least on determining to include one or more elements in the display of the remote desktop.

20. The processor of claim 17, wherein metadata of at least one desktop element represented in the encoded frame is transmitted with the video stream using one or more structured byte-wise diffs, the one or more structured byte-wise diffs being used to delta-encode one or more desktop properties of the at least one desktop element.

* * * * *